US011430086B2

(12) United States Patent
Bleyer et al.

(10) Patent No.: US 11,430,086 B2
(45) Date of Patent: Aug. 30, 2022

(54) UPSAMPLING LOW TEMPORAL RESOLUTION DEPTH MAPS

(71) Applicant: MICROSOFT TECHNOLOGY LICENSING, LLC, Redmond, WA (US)

(72) Inventors: Michael Bleyer, Seattle, WA (US); Raymond Kirk Price, Redmond, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 15/931,535

(22) Filed: May 13, 2020

(65) Prior Publication Data

US 2021/0358084 A1 Nov. 18, 2021

(51) Int. Cl.

| | |
|---|---|
| ***G06T 3/40*** | (2006.01) |
| ***G06T 7/593*** | (2017.01) |
| ***G06T 5/00*** | (2006.01) |
| ***G06T 5/20*** | (2006.01) |
| ***G06T 5/50*** | (2006.01) |

(52) U.S. Cl.

CPC ............ *G06T 3/4053* (2013.01); *G06T 5/001* (2013.01); *G06T 5/20* (2013.01); *G06T 5/50* (2013.01); *G06T 7/593* (2017.01); *G06T 2207/20028* (2013.01); *G06T 2207/20192* (2013.01)

(58) Field of Classification Search

None

See application file for complete search history.

(56) References Cited

U.S. PATENT DOCUMENTS

| | | | | |
|---|---|---|---|---|
| 9,967,516 B2 * | 5/2018 | Chang | G06T 7/521 | |
| 2010/0129048 A1 * | 5/2010 | Pitts | H04N 7/01 | 386/278 |
| 2010/0142824 A1 * | 6/2010 | Lu | G06K 9/32 | 382/195 |
| 2010/0194856 A1 * | 8/2010 | Varekamp | H04N 13/261 | 348/42 |
| 2011/0002541 A1 * | 1/2011 | Varekamp | G06T 7/11 | 382/173 |
| 2017/0134639 A1 * | 5/2017 | Pitts | H04N 5/23218 | |

(Continued)

OTHER PUBLICATIONS

Chiu, et al., "Voting-Based Depth Map Refinement and Propagation for 2D to 3D Conversion", In Proceedings of The 2012 Asia Pacific Signal and Information Processing Association Annual Summit and Conference, Dec. 3, 2012, 8 Pages.

(Continued)

*Primary Examiner* — Jiangeng Sun

(74) *Attorney, Agent, or Firm* — Workman Nydegger

(57) ABSTRACT

Systems and methods are provided for upsampling low temporal resolution depth maps. This upsampling is performed by obtaining a stereo pair of images of a scene captured at a first timepoint, generating a first depth map of the scene for the first timepoint by performing stereo matching on the stereo pair of images, obtaining a subsequent stereo pair of images captured at a subsequent timepoint to the first timepoint, and generating a subsequent depth map that corresponds to the subsequent timepoint by applying an edge-preserving filter using the first depth map without performing stereo matching on the subsequent stereo pair of images.

18 Claims, 17 Drawing Sheets

Prior Timepoint 655A

Target Timepoint 655C

Subsequent Timepoint 655D

Stereo Pair of Images 610A

Stereo Pair of Images 610C

Stereo Pair of Images 610D

Depth Map 615A

Interpolated Depth Map 620

Depth Map 615D

(56) References Cited

U.S. PATENT DOCUMENTS

| | | | | |
|---|---|---|---|---|
| 2017/0193830 | A1* | 7/2017 | Fragoso | G05D 1/102 |
| 2018/0103243 | A1* | 4/2018 | Lee | G06T 7/12 |
| 2018/0160046 | A1* | 6/2018 | Nash | H04N 5/232935 |
| 2019/0101758 | A1 | 4/2019 | Zhu et al. | |
| 2020/0204777 | A1* | 6/2020 | Goldman | H04N 13/122 |

OTHER PUBLICATIONS

Lie, et al., "2D to 3D Video Conversion with Key-Frame Depth Propagation and Trilateral Filtering", In Journal of Electronics Letters, vol. 47, Issue 5, Mar. 3, 2011, 2 Pages.
"International Search Report and the Written Opinion Issued in PCT Application No. PCT/US2021/019307", dated Jun. 1, 2021, 34 Pages. (MS# 408399-WO-PCT).
Wang, et al., "A Novel Depth Propagation Algorithm with Color Guided Motion Estimation", In Proceedings of the Visual Communications and Image Processing, Nov. 17, 2013, 6 Pages.

* cited by examiner

UPSAMPLING LOW TEMPORAL RESOLUTION DEPTH MAPS

BACKGROUND

Mixed-reality systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Many mixed-reality systems include a depth detection system (e.g., time of flight camera, rangefinder, stereoscopic depth cameras, etc.). A depth detection system provides depth information about the real-world environment surrounding the mixed-reality system to enable the system to accurately present mixed-reality content (e.g., holograms) with respect to real-world objects. As an illustrative example, a depth detection system is able to obtain depth information for a real-world table positioned within a real-world environment. The mixed-reality system is then able to render and display a virtual figurine accurately positioned on the real-world table such that the user perceives the virtual figurine as though it were part of the user's real-world environment.

A mixed-reality system may also employ cameras of a depth detection system, such as stereo cameras, for other purposes. For example, a mixed-reality system may utilize images obtained by stereo cameras to provide a pass-through view of the user's environment to the user. A pass-through view can aid users in avoiding disorientation and/or safety hazards when transitioning into and/or navigating within a mixed-reality environment.

Furthermore, in some instances, a mixed-reality system includes stereo cameras of various modalities to provide views of a user's environment that enhance the user's understanding of their real-world environment. For example, a mixed-reality system that includes long wavelength thermal imaging cameras may allow a user (e.g., a first responder) to see through smoke, haze, fog, and/or dust. In another example, a mixed-reality system that includes low light imaging cameras may allow a user (e.g., a first responder) to see in dark environments where the ambient light level is below the level required for human vision.

A mixed-reality system can present views captured by stereo cameras to users in a variety of ways. The process of using images captured by world-facing cameras to provide three-dimensional views of a real-world environment to a user creates many challenges.

Initially, the physical positioning of the stereo cameras is physically separated from the physical positioning of the user's eyes. Thus, directly providing the images captured by the stereo cameras to the user's eyes would cause the user to perceive the real-world environment incorrectly. For example, a vertical offset between the positioning of the user's eyes and the positioning of the stereo cameras can cause the user to perceive real-world objects as vertically offset from their true position with respect to the user. In another example, a difference in the spacing between the user's eyes and the spacing between the stereo cameras can cause the user to perceive real-world objects with incorrect depth.

The difference in perception between how the cameras observe an object and how a user's eyes observe an object is often referred to as the "parallax problem" or "parallax error." FIG. 1 illustrates a conceptual representation of the parallax problem in which a stereo pair of cameras 105A and 105B is physically separated from a user's eyes 110A and 110B. Sensor region 115A conceptually depicts the image sensing regions of camera 105A (e.g., the pixel grid) and the user's eye 110A (e.g., the retina). Similarly, sensor region 115B conceptually depicts the image sensing regions of camera 105B and the user's eye 110B.

The cameras 105A and 105B and the user's eyes 110A and 110B perceive an object 130, as indicated in FIG. 1 by the lines extending from the object 130 to the cameras 105A and 105B and the user's eyes 110A and 110B, respectively. FIG. 1 illustrates that the cameras 105A and 105B perceive the object 130 at different positions on their respective sensor regions 115A, 115B. Similarly, FIG. 1 shows that the user's eyes 110A and 110B perceive the object 130 at different positions on their respective sensor regions 115A, 115B. Furthermore, the user's eyes 110A perceives the object 130 at a different position on sensor region 115A than camera 105A, and the user's eye 110B perceives the object 130 at a different position on sensor region 115B than camera 1058.

Some approaches for correcting for the parallax problem involve performing a camera reprojection from the perspective of the stereo cameras to the perspective of the user's eyes. For instance, some approaches involve performing a calibration step to determine the differences in physical positioning between the stereo cameras and the user's eyes. Then, after capturing a timestamped pair of stereo images with the stereo cameras, a step of calculating depth information (e.g., a depth map) based on the stereo pair of images is performed (e.g., by performing stereo matching). Subsequently, a system can reproject the calculated depth information to the perspective of the user's left eye and right eye (as depicted in FIG. 1 by reprojection arrows 120A and 120B).

However, calculating and processing depth information based on a stereo pair of images, particularly when addressing the parallax problem, is associated with many challenges. For example, performing stereo matching to generate a depth map based on a stereo pair of images is a computationally expensive and/or time-consuming process. In some instances, the complexity of a depth calculation is a product of the number of pixels in the image frames and the number of disparity calculations to be performed. Thus, conventional mixed-reality systems may struggle to generate depth maps without significant latency, particularly where the underlying stereo pair of images has high image resolution. The latency in calculating depth maps also delays operations that rely on depth information (e.g., parallax error correction), resulting in a poor user experience.

For at least the foregoing reasons, there is an ongoing need and desire for improved techniques and systems for calculating and processing depth information, particularly for systems that need to resolve parallax problems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for upsampling low temporal resolution depth maps. For example, at least some of the disclosed embodiments are directed to generating depth maps by upsampling low temporal resolution depth maps.

In some embodiments, a system includes one or more processors and one or more hardware storage devices having stored computer-executable instructions that are operable, when executed by the one or more processors, to cause the system to perform certain acts, including at least the act of obtaining a stereo pair of images of a scene captured at a first timepoint. In some instances, the acts further include generating a first depth map of the scene for the first timepoint by performing stereo matching on the stereo pair of images. In some implementations, the acts further include obtaining a subsequent stereo pair of images captured at a subsequent timepoint to the first timepoint. Also, in some embodiments, the acts further include generating a subsequent depth map that corresponds to the subsequent timepoint by applying an edge-preserving filter using the first depth map without performing stereo matching on the subsequent stereo pair of images.

At least some disclosed embodiments are associated with a reduction in computational cost associated with generating subsequent depth maps (e.g., as compared with processes for generating subsequent depth maps by performing subsequent stereo matching, for example).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
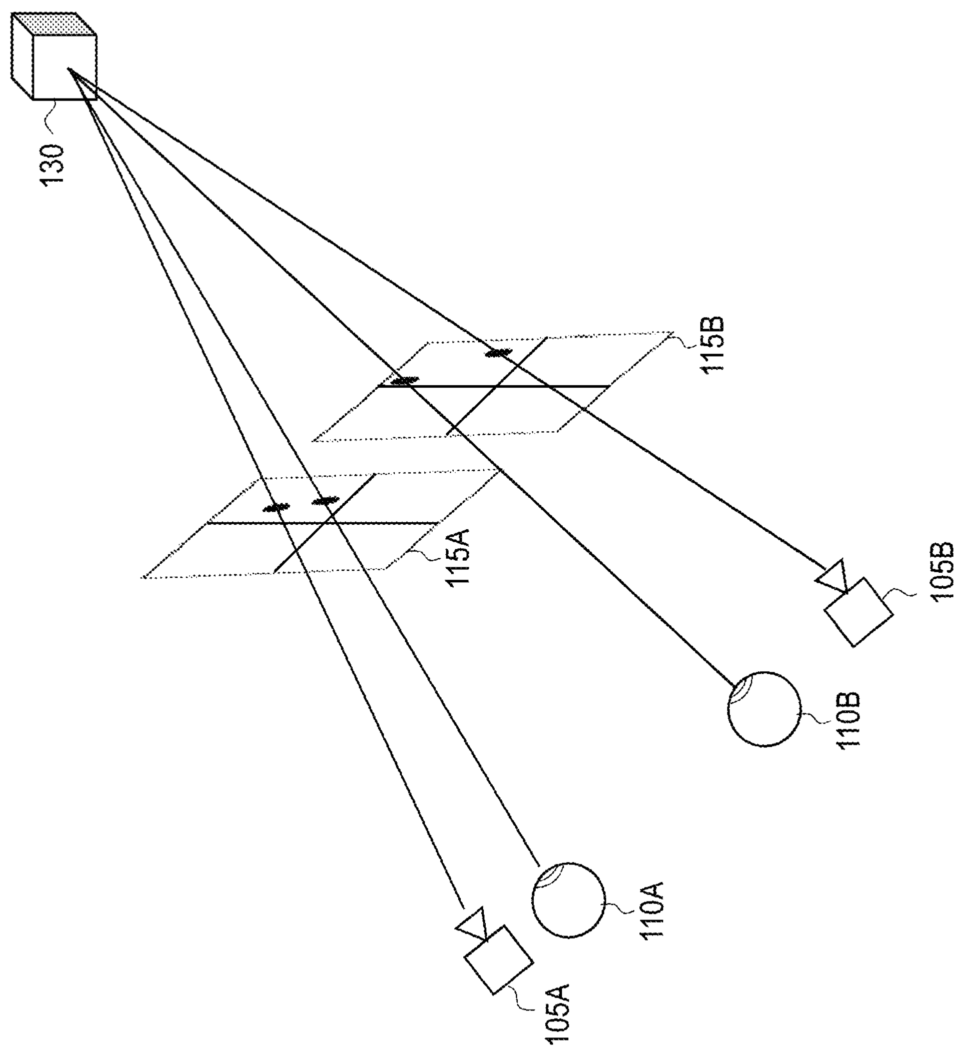
FIG. 1 illustrates an example of the parallax problem that occurs when cameras have a different perspective than a user's eyes.

Disclosed embodiments include systems and methods for upsampling low temporal resolution depth maps. For example, at least some of the disclosed embodiments are directed to generating depth maps by upsampling low temporal resolution depth maps.

In some instances, this upsampling of the low temporal resolution depth maps is performed by obtaining a stereo pair of images of a scene captured at a first timepoint, generating a first depth map of the scene for the first timepoint by performing stereo matching on the stereo pair of images, obtaining a subsequent stereo pair of images captured at a subsequent timepoint to the first timepoint, and generating a subsequent depth map that corresponds to the subsequent timepoint by applying an edge-preserving filter using the first depth map without performing stereo matching on the subsequent stereo pair of images.

In some instances, a system includes one or more processors and one or more hardware storage devices having stored computer-executable instructions that are operable, when executed by the one or more processors, to cause the system to perform the disclosed methods for upsampling low temporal resolution depth maps.

Examples of Technical Benefits, Improvements, and Practical Applications

Those skilled in the art will recognize, in view of the present disclosure, that at least some of the disclosed embodiments may address various shortcomings associated with generating depth maps, particularly for low-latency operations, such as providing parallax-corrected pass-through images. The following section outlines some example improvements and/or practical applications provided by the disclosed embodiments. It will be appreciated, however, that the following are examples only and that the embodiments described herein are in no way limited to the example improvements discussed herein.

In some implementations, generating depth maps by upsampling low temporal resolution depth maps (e.g., by interpolation) reduces the computational burden associated with generating depth maps (e.g., compared with performing stereo matching alone to generate depth maps).

In some instances, the reduced computational provided by at least some of the disclosed embodiments enables depth map generation at a higher frequency than conventional approaches (e.g., performing stereo matching alone). For example, at least some disclosed embodiments may enable depth map generation at a framerate that matches the capture framerate of a stereo camera pair (e.g., 45 Hz, 60 Hz, 90 Hz, etc.). Accordingly, in some instances, at least some of the disclosed embodiments may provide a depth map for each image frame captured by a stereo camera pair, including at high frequencies.

High frequency depth map generation (e.g., providing a depth map for each captured stereo pair of images) may improve user experiences that depend on near-real-time depth calculations, such as, for example, providing parallax-corrected pass-through images of a user's environment, hand or other object tracking, surface reconstruction mesh building or updating, streaming stereoscopic video, and/or others at a higher frame rate or with lower latency than would otherwise be possible using traditional techniques.

Having just described some of the various high-level features and benefits of the disclosed embodiments, attention will now be directed to FIGS. 2 through 10. These Figures illustrate various conceptual representations, architectures, methods, and supporting illustrations related to systems and methods for upsampling low temporal resolution depth maps. The disclosure will then turn to FIG. 11, which presents an example computer system that may include and/or be used to facilitate the disclosed principles.

Example Mixed-Reality Systems and HMDs

Figure 2:
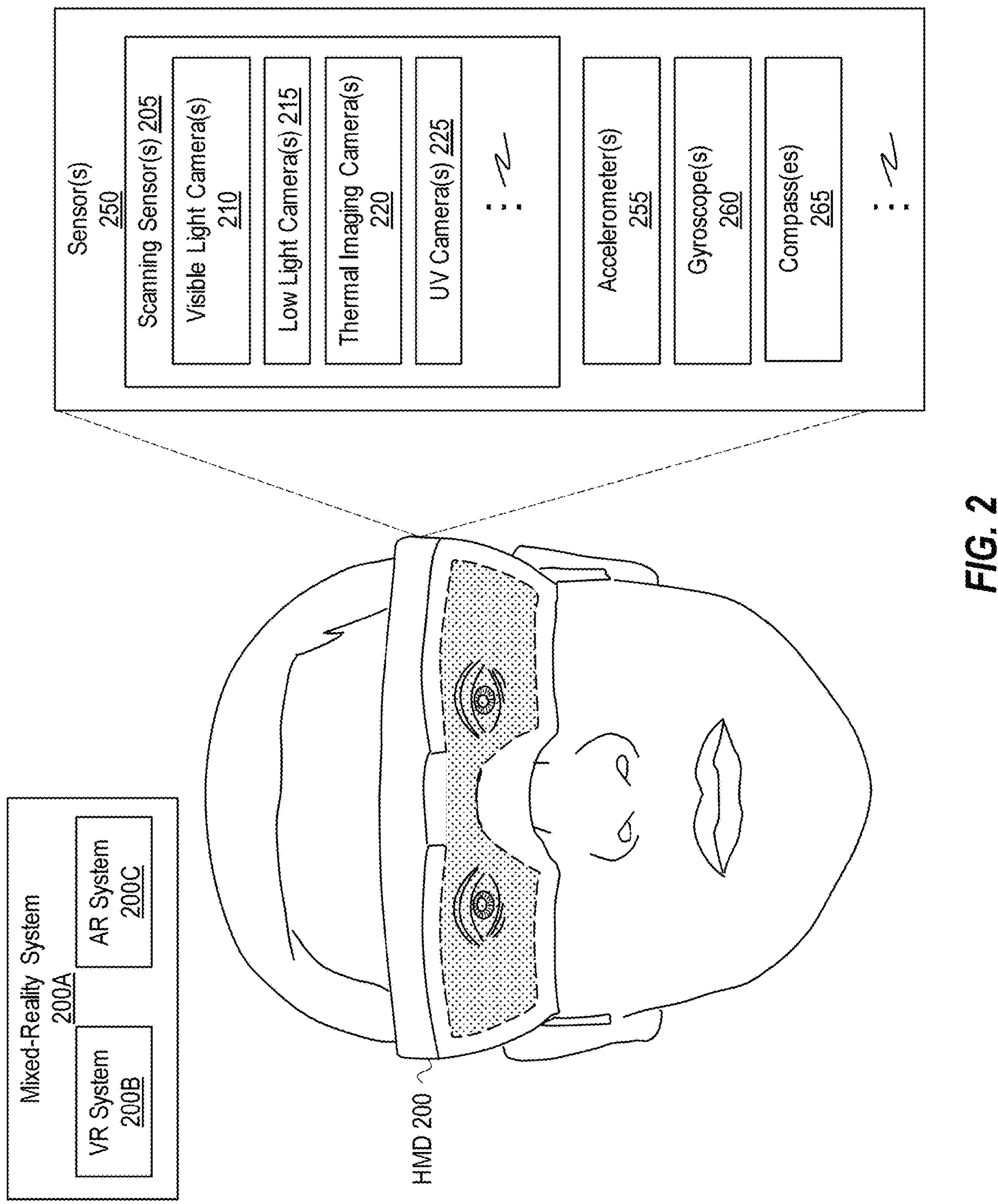
FIG. 2 illustrates an example mixed-reality system that may include or be used to implement disclosed embodiments.

Attention will now be directed to FIG. 2, which illustrates an example of a head-mounted device (HMD) 200. HMD 200 can be any type of mixed-reality system 200A (MR system), including a VR system 200B or an AR system 200C. It should be noted that while a substantial portion of this disclosure is focused, in some respects, on the use of an HMD, the embodiments are not limited to being practiced using only an HMD. That is, any type of system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

FIG. 2 illustrates HMD 200 as including sensor(s) 250, including scanning sensor(s) 205 and other sensors, such as accelerometer(s) 255, gyroscope(s) 260, compass(es) 265. The ellipsis 270 conveys that the sensor(s) 250 depicted in FIG. 2 are illustrative only and non-limiting. For instance, in some implementations, an HMD 200 includes other interoceptive and/or exteroceptive sensors not explicitly illustrated in FIG. 2, such as eye tracking systems, radio-based navigation systems, microphones, and/or other sensing apparatuses.

The accelerometer(s) 255, gyroscope(s) 260, and compass(es) 265 are configured to measure inertial tracking data. Specifically, the accelerometer(s) 255 is/are configured to measure acceleration, the gyroscope(s) 260 is/are configured to measure angular velocity data, and the compass(es) 265 is/are configured to measure heading data. The inertial tracking components of the HMD 200 (i.e., the accelerometer(s) 255, gyroscope(s) 260, and compass(es) 265) may operate in concert with visual tracking systems (e.g., cameras) to form a head tracking system that generates pose data for the HMD 200.

For example, visual-inertial Simultaneous Location and Mapping (SLAM) in an HMD 200 fuses (e.g., with a pose filter) visual tracking data obtained by one or more cameras (e.g., head tracking cameras) with inertial tracking data obtained by the accelerometer(s) 255, gyroscope(s) 260, and compass(es) 265 to estimate six degree of freedom (6DOF) positioning (i.e., pose) of the HMD 200 in space and in real time. 6DOF refers to positioning/velocity information associated with three perpendicular directional axes and the three rotational axes (often referred to as pitch, yaw, and roll) about each of the three perpendicular directional axes (often referred to as x, y, and z).

In some instances, the visual tracking system(s) of an HMD 200 (e.g., head tracking cameras) is/are implemented as one or more dedicated cameras. In other instances, the visual tracking system(s) is/are implemented as part of a camera system that performs other functions (e.g., as part of one or more cameras of the scanning sensor(s) 205, described hereinbelow).

The scanning sensor(s) 205 comprise any type of scanning or camera system, and the HMD 200 can employ the scanning sensor(s) 205 to scan environments, map environments, capture environmental data, and/or generate any kind of images of the environment. For example, in some instances, the HMD 200 is configured to generate a 3D representation of the real-world environment or generate a "passthrough" visualization. Scanning sensor(s) 205 may comprise any number or any type of scanning devices, without limit.

In accordance with the disclosed embodiments, the HMD 200 may be used to generate a parallax-corrected passthrough visualization of the user's environment. As described earlier, a "passthrough" visualization refers to a visualization that reflects what the user would see if the user were not wearing the HMD 200, regardless of whether the HMD 200 is included as a part of an AR system or a VR system. To generate this passthrough visualization, the HMD 200 may use its scanning sensor(s) 205 to scan, map, or otherwise record its surrounding environment, including any objects in the environment, and to pass that data on to the user to view. In many cases, the passed-through data is modified to reflect or to correspond to a perspective of the user's pupils. The perspective may be determined by any type of eye tracking technique. As the camera modules are not telecentric with the user's eyes, this perspective difference will need to be corrected.

To convert a raw image into a passthrough image, the scanning sensor(s) 205 typically rely on its cameras (e.g., head tracking cameras, hand tracking cameras, depth cameras, or any other type of camera) to obtain one or more raw images of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images, and pass-through images can be generated (e.g., one for each pupil) using the depth map for any reprojections.

As used herein, a "depth map" details the positional relationship and depths relative to objects in the environment. Consequently, the positional arrangement, location, geometries, contours, and depths of objects relative to one another can be determined. From the depth maps (and possibly the raw images), a 3D representation of the environment can be generated.

Relatedly, from the passthrough visualizations, a user will be able to perceive what is currently in his/her environment without having to remove or reposition the HMD 200. Furthermore, as will be described in more detail later, the disclosed passthrough visualizations may also enhance the user's ability to view objects within his/her environment (e.g., by displaying additional environmental conditions that may not have been detectable by a human eye).

It should be noted that while a portion of this disclosure focuses on generating "a" passthrough image, the implementations described herein may generate a separate pass-through image for each one of the user's eyes. That is, two passthrough images are typically generated concurrently with one another. Therefore, while frequent reference is made to generating what seems to be a single passthrough image, the implementations described herein are actually able to simultaneously generate multiple passthrough images.

In some embodiments, scanning sensor(s) 205 include visible light camera(s) 210, low light camera(s) 215, thermal imaging camera(s) 220, and potentially (though not necessarily) ultraviolet (UV) cameras 225, or Near Infrared Cameras (in the 800 nm to 2 um range). The ellipsis 230 demonstrates how any other type of camera or camera system (e.g., depth cameras, time of flight cameras, etc.) may be included among the scanning sensor(s) 205. As an example, a camera structured to detect mid-infrared wavelengths may be included within the scanning sensor(s) 205.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 210 include two or more red, green, blue (RGB) cameras structured to capture light photons within the visible spectrum. Often, these RGB cameras are complementary metal-oxide-semiconductor (CMOS) type cameras, though other camera types may be used as well (e.g., charge coupled devices, CCD).

The RGB cameras may be implemented as stereoscopic cameras, meaning that the fields of view of the two or more RGB cameras at least partially overlap with one another. With this overlapping region, images generated by the visible light camera(s) 210 can be used to identify disparities between certain pixels that commonly represent an object captured by both images. Disparities are measured after applying rectification to the stereo pair of images such that corresponding pixels in the images that commonly represent an object in the environment are aligned along scanlines. After rectification, corresponding pixels in the different images that commonly represent an object in the environment only differ in one dimension (e.g., the direction of the scanlines, such as the horizontal direction). The one-dimensional difference between corresponding pixels in their respective images of the stereo pair of images represents the disparity value for the object represented by the corresponding pixels.

Based on these pixel disparities, the embodiments are able to determine depths for objects located within the overlapping region (i.e. "stereoscopic depth matching," "stereo depth matching," or simply "stereo matching"). As such, the visible light camera(s) 210 can be used to not only generate passthrough visualizations, but they can also be used to determine object depth. In some embodiments, the visible light camera(s) 210 can capture both visible light and IR light.

Those skilled in the art will recognize, in view of the present disclosure, that stereo matching may be performed on a stereo pair of images obtained by any type and/or combination of cameras. For example, an HMD 200 or other system may comprise any combination of visible light camera(s) 210, low light camera(s) 215, thermal imaging camera(s) 220, UV camera(s) 225, Near Infrared Red, and/or other cameras to capture a stereo pair of images upon which to perform stereo matching (e.g., for the overlapping region of the stereo pair of images).

The low light camera(s) 215 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 215 are structured to detect or be sensitive to IR light in at least the near-IR range.

In some embodiments, the visible light camera(s) 210 and the low light camera(s) 215 (aka low light night vision cameras) operate in approximately the same overlapping wavelength range. In some cases, this overlapping wavelength range is between about 400 nanometers and about 1,000 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 210 are low power cameras and operate in environments where the illuminance is between about 10 lux and about 100,000 lux, or rather, the illuminance range begins at about 10 lux and increases beyond 10 lux. In contrast, the low light camera(s) 215 consume more power and operate in environments where the illuminance range is between about 1 milli-lux and about 10 lux.

The thermal imaging camera(s) 220, on the other hand, are structured to detect electromagnetic radiation or IR light in the far-IR (i.e. thermal-IR) range, though some implementations also enable the thermal imaging camera(s) 220 to detect radiation in the mid-IR range. To clarify, the thermal imaging camera(s) 220 may be a long wave infrared imaging camera structured to detect electromagnetic radiation by measuring long wave infrared wavelengths. Often, the thermal imaging camera(s) 220 detect IR radiation having wavelengths between about 8 microns and 14 microns. Because the thermal imaging camera(s) 220 detect far-IR radiation, the thermal imaging camera(s) 220 can operate in any illuminance condition, without restriction.

In some cases (though not necessarily all), the thermal imaging camera(s) 220 include an uncooled thermal imaging sensor. An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 225 are structured to capture light in the UV range. The UV range includes electromagnetic radiation having wavelengths between about 10 nm and about 400 nm. The disclosed UV camera(s) 225 should be interpreted broadly and may be operated in a manner that includes both reflected UV photography and UV induced fluorescence photography.

Accordingly, as used herein, reference to "visible light cameras" (including "head tracking cameras"), are cameras that are primarily used for computer vision to perform head tracking (e.g., as referenced above with reference to visual-inertial SLAM). These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

Accordingly, the disclosed embodiments may be structured to utilize numerous different camera types. The different camera types include, but are not limited to, visible light cameras, low light cameras, thermal imaging cameras, and UV cameras.

Generally, the low light camera(s) 215, the thermal imaging camera(s) 220, and the UV camera(s) 225 (if present) consume relatively more power than the visible light camera(s) 210. Therefore, when not in use, the low light camera(s) 215, the thermal imaging camera(s) 220, and the UV camera(s) 225 are typically in the powered-down state in which those cameras are either turned off (and thus consuming no power) or in a reduced operability mode (and thus consuming substantially less power than if those cameras were fully operational). In contrast, the visible light camera(s) 210 are typically in the powered-up state in which those cameras are by default fully operational.

It should be noted that any number of cameras may be provided on the HMD 200 for each of the different camera type(s) 245. That is, the visible light camera(s) 210 may include 1, 2, 3, 4, 5, 6, 7, 8, 9, 10, or more than 10 cameras. Often, however, the number of cameras is at least 2 so the HMD 200 can perform stereoscopic depth matching, as described earlier. Similarly, the low light camera(s) 215, the thermal imaging camera(s) 220, and the UV camera(s) 225 may each respectively include 1, 2, 3, 4, 5, 6, 7, 8, 9, 10, or more than 10 corresponding cameras.

Figure 3:
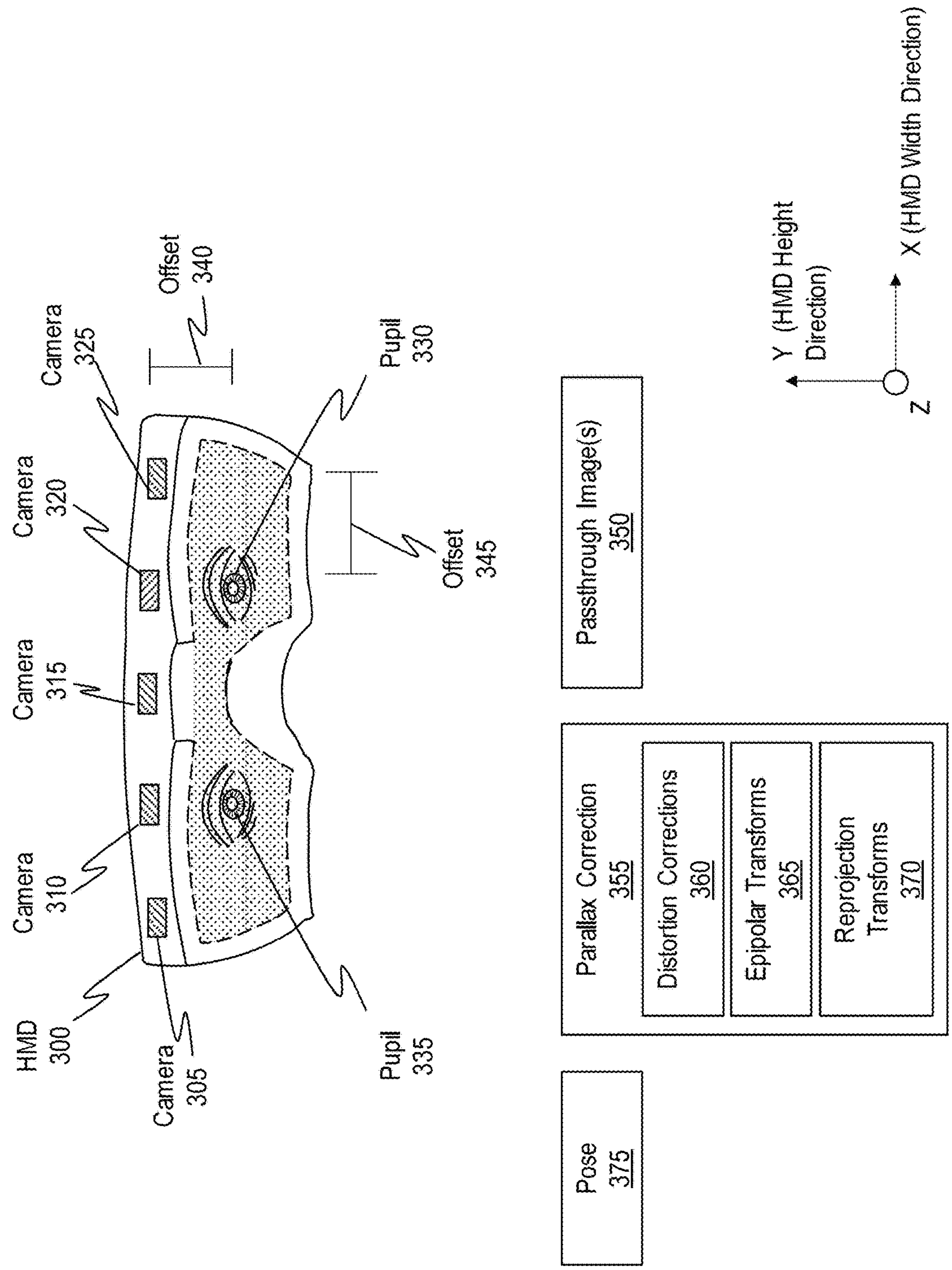
FIG. 3 illustrates example structural configurations of components of an example mixed-reality system, as well as an example of a parallax correction operation.

FIG. 3 illustrates an example HMD 300, which is representative of the HMD 200 from FIG. 2. HMD 300 is shown as including multiple different cameras, including cameras 305, 310, 315, 320, and 325. Cameras 305-325 are representative of any number or combination of the visible light camera(s) 210, the low light camera(s) 215, the thermal imaging camera(s) 220, and the UV camera(s) 225 from FIG. 2. While only 5 cameras are illustrated in FIG. 3, HMD 300 may include more or fewer than 5 cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e. the "Y" axis), as shown by offset 340. Similarly, there may be a horizontal offset in the HMD width direction (i.e. the "X" axis), as shown by offset 345.

As described earlier, HMD 300 is configured to provide passthrough image(s) 350 for the user of HMD 300 to view. In doing so, HMD 300 is able to provide a visualization of the real world without requiring the user to remove or reposition HMD 300. These passthrough image(s) 350 effectively represent the same view the user would see if the user were not wearing HMD 300. In some instances, the HMD

300 employs at least some of cameras 305-325 to provide these passthrough image(s) 350.

None of the cameras 305-325, however, are directly aligned with the pupils 330 and 335. The offsets 340 and 345 actually introduce differences in perspective as between the cameras 305-325 and the pupils 330 and 335. These perspective differences are referred to as "parallax."

Because of the parallax occurring as a result of the offsets 340 and 345, raw images produced by the cameras 305-325 are not available for immediate use as passthrough image(s) 350. Instead, it is beneficial to perform a parallax correction 355 (aka an image synthesis or reprojection) on the raw images to transform (or reproject) the perspectives embodied within those raw images to correspond to perspectives of the user's pupils 330 and 335. The parallax correction 355 includes any number of distortion corrections 360 (e.g., to correct for concave or convex wide or narrow angled camera lenses), epipolar transforms 365 (e.g., to parallelize the optical axes of the cameras), and/or reprojection transforms 370 (e.g., to reposition the optical axes so as to be essentially in front of or in-line with the user's pupils). The parallax correction 355 includes performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

The reprojections are based on a current pose 375 of the HMD 300 relative to its surrounding environment (e.g., as determined via visual-inertial SLAM). Based on the pose 375 and the depth maps that are generated, the HMD 300 and/or other system is/are able to correct parallax error by reprojecting a perspective embodied by the raw images to coincide with a perspective of the user's pupils 330 and 335.

By performing these different transforms, the HMD 300 is able to perform three-dimensional (3D) geometric transforms on the raw camera images to transform the perspectives of the raw images in a manner so as to correlate with the perspectives of the user's pupils 330 and 335. Additionally, the 3D geometric transforms rely on depth computations in which the objects in the HMD 300's environment are mapped out to determine their depths as well as the pose 375. Based on these depth computations and pose 375, the HMD 300 is able to three-dimensionally reproject or three-dimensionally warp the raw images in such a way so as to preserve the appearance of object depth in the passthrough image(s) 350, where the preserved object depth substantially matches, corresponds, or visualizes the actual depth of objects in the real world. Accordingly, the degree or amount of the parallax correction 355 is at least partially dependent on the degree or amount of the offsets 340 and 345.

By performing the parallax correction 355, the HMD 300 effectively creates "virtual" cameras having positions that are in front of the user's pupils 330 and 335. By way of additional clarification, consider the position of camera 305, which is currently above and to the left of the pupil 335. By performing the parallax correction 355, the embodiments programmatically transform images generated by camera 305, or rather the perspectives of those images, so the perspectives appear as though camera 305 were actually positioned immediately in front of pupil 335. That is, even though camera 305 does not actually move, the embodiments are able to transform images generated by camera 305 so those images have the appearance as if camera 305 were positioned in front of pupil 335.

Although the present disclosure focuses, in some respects, on depth map generation for performing parallax error correction, it should be noted that at least some of the principles described herein are applicable to any implementation that involves generating a depth map and/or relies on depth map generation. By way of non-limiting example, at least some of the principles disclosed herein may be employed in hand tracking (or tracking other real-world objects), stereoscopic video streaming, building surface reconstruction meshes, and/or other applications.

Upsampling Low Temporal Resolution Depth Maps

Figure 4A:
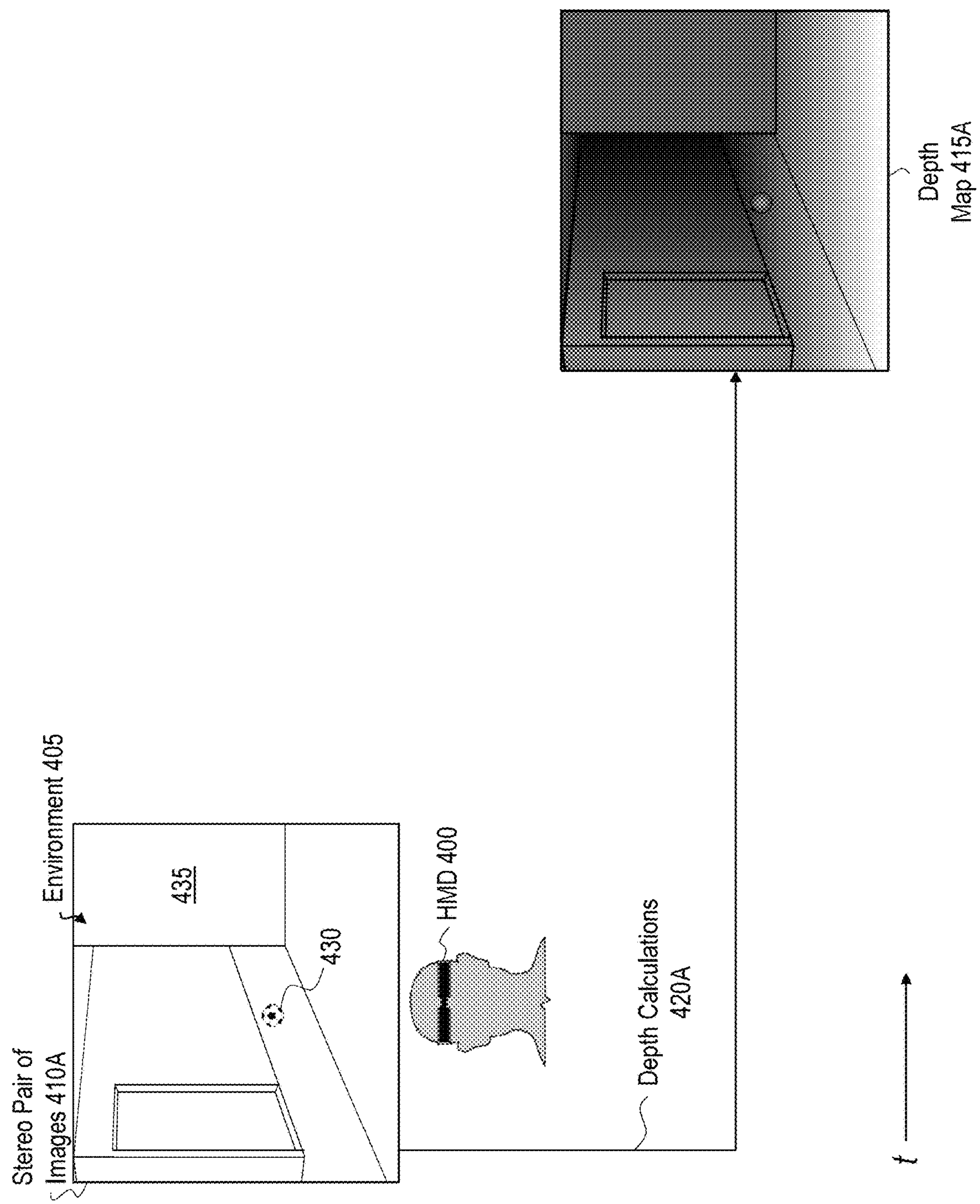
FIG. 4A illustrates capturing a stereo pair of images of an environment and generating a depth map of the environment.

Attention is now directed to FIG. 4A, which illustrates an HMD 400 capturing an environment 405. As used herein, "scene" and "environment" are used interchangeably and refer broadly to any real-world space comprising any arrangement and/or type of real-world objects. As used herein, "mixed-reality environment" refers to any real-world environment that includes virtual content implemented therein/thereon (e.g., holograms of an AR environment), or any immersive virtual environment that only includes virtual content (e.g., a VR environment). One will recognize that virtual content can include virtual representations of real-world objects.

The HMD 400 is representative of the HMD 200 referred to in FIG. 2. As such, the HMD 400 utilizes scanning sensor(s) 205 to capture the environment 405. For example, in some instances, the HMD 400 utilizes stereo cameras (e.g., a left camera and a right camera) to capture a stereo pair of images 410A of the environment 405, including a left image and a right image of the environment 405. The left image and the right image cover an overlap region (depicted in FIG. 4A as the stereo pair of images 410A) in which the left image and the right image each include corresponding pixels that represent common portions and/or objects of the environment 405. For example, both the left image and the right image include pixels that represent the ball 430 and the wall 435 positioned within the environment 405.

As noted hereinabove, the stereo cameras of the HMD 400 may include any type and/or modality of camera, such as visible light camera(s) 210, low light camera(s) 215, thermal imaging camera(s) 220, or any other type of camera or combinations thereof. One will recognize, in view of the present disclosure, that the designations of "left" and "right" for the stereo cameras are somewhat arbitrary and not limiting of the present disclosure in any way, and that other configurations are within the scope of this disclosure (e.g., a top camera and a bottom camera).

In some instances, a system (e.g., HMD 400) rectifies the stereo pair of images 410A and performs depth calculations 420A, such as stereo matching, to generate a depth map 415A that includes depth information for the portions of the environment 405 represented within the stereo pair of images 410A. As noted above, in some instances, stereo matching involves identifying disparity values for corresponding pixels of different images of a rectified stereo pair of images that commonly represent an object captured by both images. In some instances, a stereo matching algorithm generates depth maps by using a cost function (or other similarity measure) to determine the cost at every pixel location for relevant disparities. A cost function of a stereo matching algorithm may implement various terms and/or optimizations to determine the cost at every pixel location, such as a data term, a smoothness term, a semi-global accumulation scheme, a continuity term, consistency checks, coarse-to-fine, and/or others. For every pixel location, the stereo matching algorithm selects the disparity value that has the overall minimum cost.

However, generating a depth map from the stereo pair of images 410A for performing parallax correction is computationally expensive, particularly for high-resolution stereo pairs of images (which may be desirable for providing parallax-corrected pass-through views of an environment). For example, FIG. 4A illustrates the HMD 400 capturing the stereo pair of images 410A at a first timepoint (e.g., indicated according to time axis, t). In some instances, because of the computational expense associated with performing the depth calculations 420A to generate a depth map, the depth map 415A is not completed until a period of time has elapsed (e.g., several frames) since the first timepoint at which the HMD 400 captured the stereo pair of images 410A. The temporal delay associated with conventional depth calculations (e.g., depth calculations 420A) may cause high latency in operations that depend on updated depth information (e.g., providing parallax-corrected pass-through views of an environment).

Figure 4B:
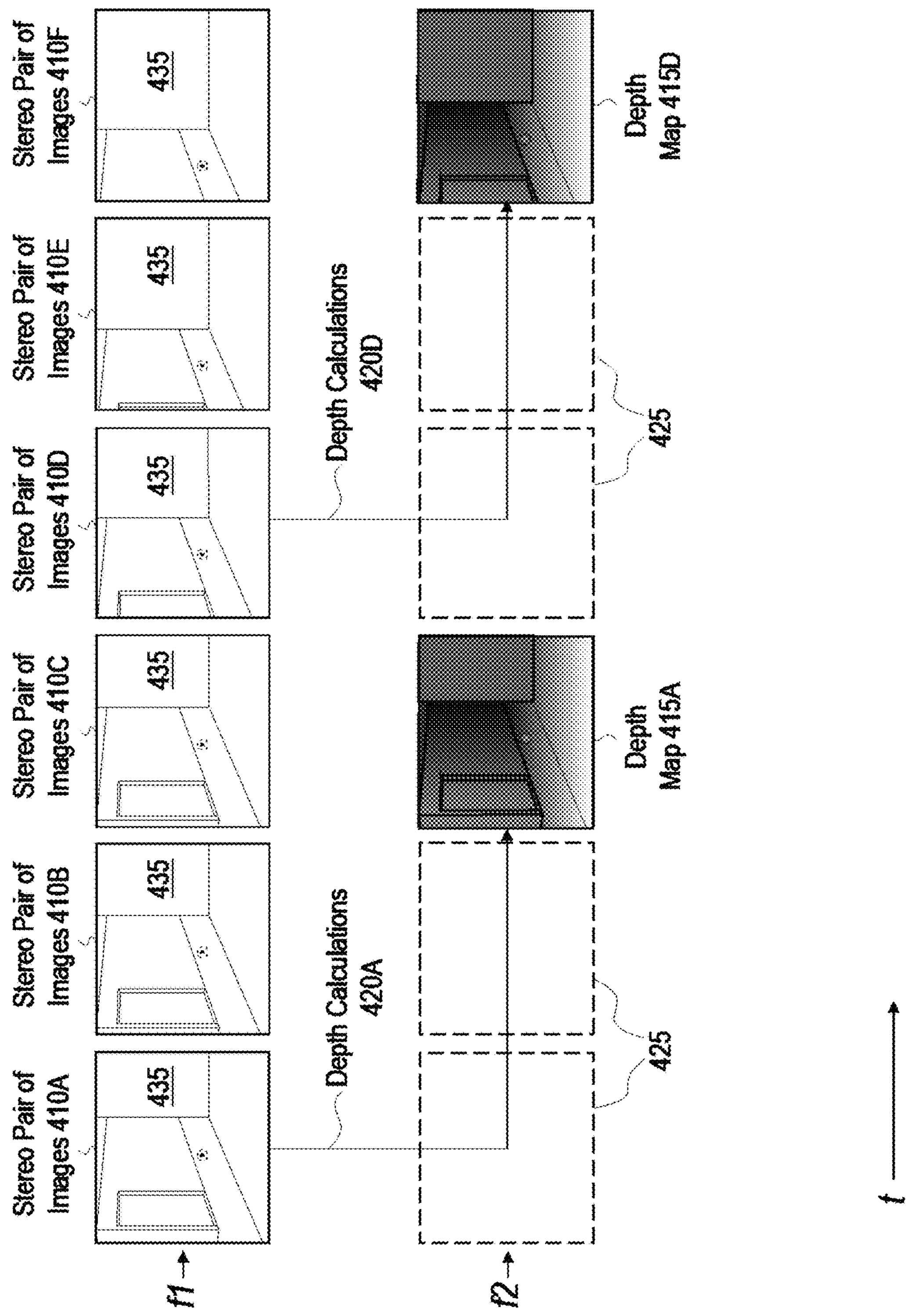
FIG. 4B illustrates capturing multiple stereo pairs of images of an environment and generating multiple depth maps of the environment over a period of time.

Furthermore, FIG. 4B illustrates a representation of a system (e.g., HMD 400) iteratively capturing stereo pairs of images over time and calculating depth maps based on some of the stereo pairs of images. Specifically, FIG. 4B shows a plurality of stereo pairs of images captured by the HMD 400 (or another system), including stereo pair of images 410A (described above, and which are visualized in FIG. 4A as a single image) and stereo pairs of images 410B-410F (with each stereo pair of images visually represented as a single image) which were captured subsequent to stereo pair of images 410A (e.g., indicated according to time axis, t).

In some instances, the HMD 400 (or another system) captures stereo pairs of images at a first frequency f1 that is high enough for the HMD 400 to provide continuous parallax-corrected pass-through views of the user's environment at a framerate that appears smooth to users. By way of non-limiting example, the first frequency f1 may be 90 Hz or another value within a range of 45 Hz to 180 Hz or another value outside of the aforementioned range.

As noted above, FIG. 4B also illustrates a representation of a system (e.g., HMD 400) iteratively generating depth maps. For example, depth map 415A is generated by performing depth calculations 420A on stereo pair of images 410A, and depth map 415D is generated by performing depth calculations 420D on stereo pair of images 410D. However, as indicated in FIGS. 4A and 4B, the depth calculations 420A are computationally expensive and time-consuming. Accordingly, FIG. 4B illustrates that the HMD 400 (or other system) generates depth maps at a second frequency f2 that is lower than the first frequency f1. In the instance shown in FIG. 4B, the second frequency f2 is 1/3 the first frequency f1, meaning that the HMD 400 (or other system) generates depth maps at 1/3 the rate that the HMD 400 captures stereo pairs of images. In at least one instance, when the first frequency f1 is 90 Hz, the second frequency f2 is 30 Hz. In other examples, the HMD 400 may generate depth maps and capture stereo pairs of images at rates of 45 Hz and 15 Hz, 120 Hz and 40 Hz, 150 Hz and 50 Hz, or 60 Hz and 180 Hz, respectively, or any range therebetween.

However, it should be noted that the frequencies for capturing stereo pairs of images and generating depth maps depicted in FIG. 4B are illustrative only, and non-limiting. For example, in other instances, the HMD 400 (or other system) generates depth maps at a rate that is 1/2 the rate at which the HMD 400 captures stereo pairs of images (or another ratio, such as 1/4, 1/5, 1/6, etc.). By way of non-limiting example, the HMD 400 may generate depth maps and capture stereo pairs of images at rates of 15 Hz and 30 Hz, 30 Hz and 60 Hz, 45 Hz and 90 Hz, 60 Hz and 120 Hz, or 90 Hz and 180 Hz, respectively, or any range therebetween.

In view of the difference between f1 and f2 depicted in FIG. 4B, FIG. 4B illustrates that several timepoints exist for which no depth information (e.g., depth map) was generated (indicated by dashed boxes 425). As a result, in the implementation depicted in FIG. 4B, the depth information captured by the HMD 400 is sparse.

By way of non-limiting example, as is evident in FIG. 4B, the stereo pairs of images 410A-410F capture the environment 405 as the perspective of the stereo cameras of the HMD 400 changes with respect to the environment 405. For instance, different portions of the wall 435 of the environment 405 are represented in the different stereo pairs of images 410A-410F, and the change in perspective of the HMD 400 with respect to the wall 435 is represented across six different captured stereo pairs of images 410A-410F in FIG. 4B. In contrast, the change in perspective of the HMD 400 with respect to the wall 435 is only represented across two depth maps 415A and 415D in FIG. 4B. Thus, the depth maps 415A and 415D of FIG. 4B fail to describe the change in perspective of the HMD 400 with as much granularity as the stereo pairs of images 410A-410F.

Sparse depth map computation may give rise to many problems in user experiences. For example, parallax-corrected pass-through experiences that use sparse depth maps rely on depth information that is updated with relative infrequency (e.g., relative to the frequency at which environment texture information from the stereo pairs of images is updated). Thus, providing parallax-corrected pass-through views of an environment while relying on sparse depth maps may result in a degraded user experience that fails to achieve a precise or seamless pass-through view of the objects within the user's environment.

Accordingly, at least some embodiments of the present disclosure provide for depth map generation by upsampling low temporal resolution depth maps, such as those obtained by performing stereo matching as described above. Pursuant to generating depth maps by upsampling low temporal resolution depth maps, FIGS. 5A-5C illustrate generating an interpolated depth map based on image data from a prior timepoint and a target timepoint.

Figure 5A:
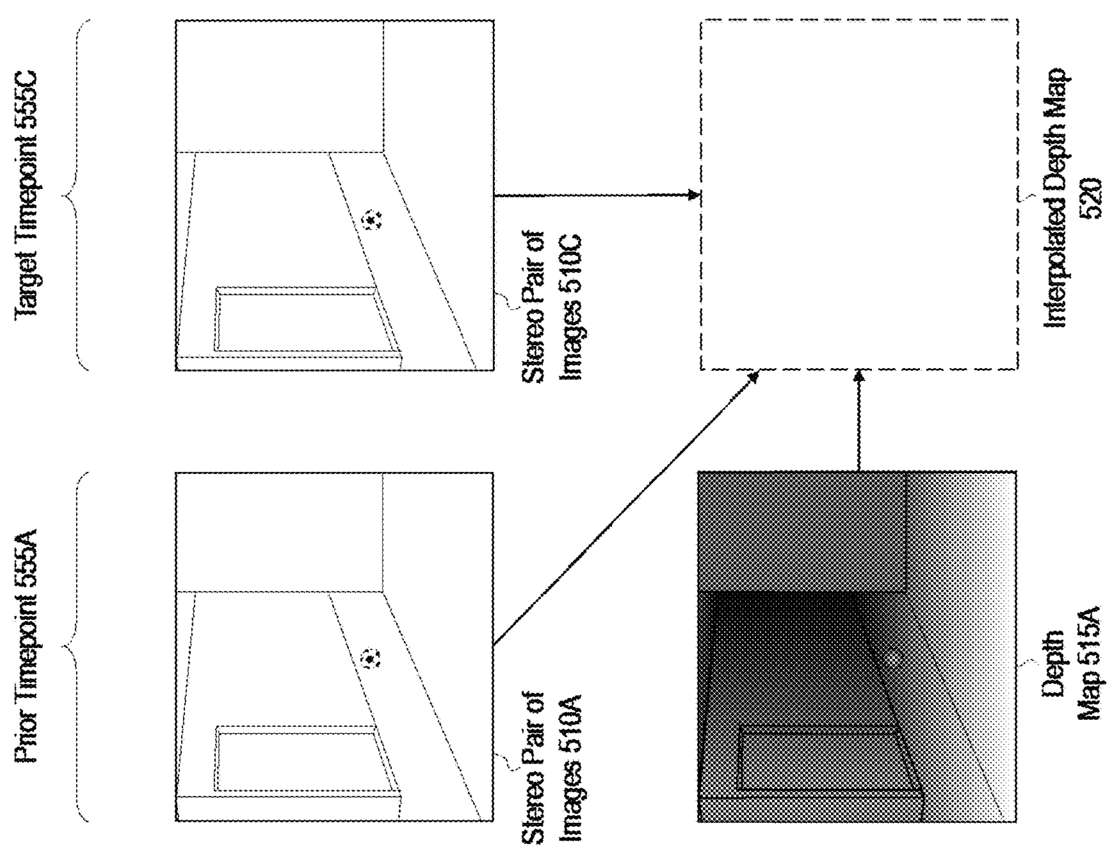
FIGS. 5A-5C illustrate generating an interpolated depth map based on image data from a prior timepoint and a target timepoint.
Figure 5B:
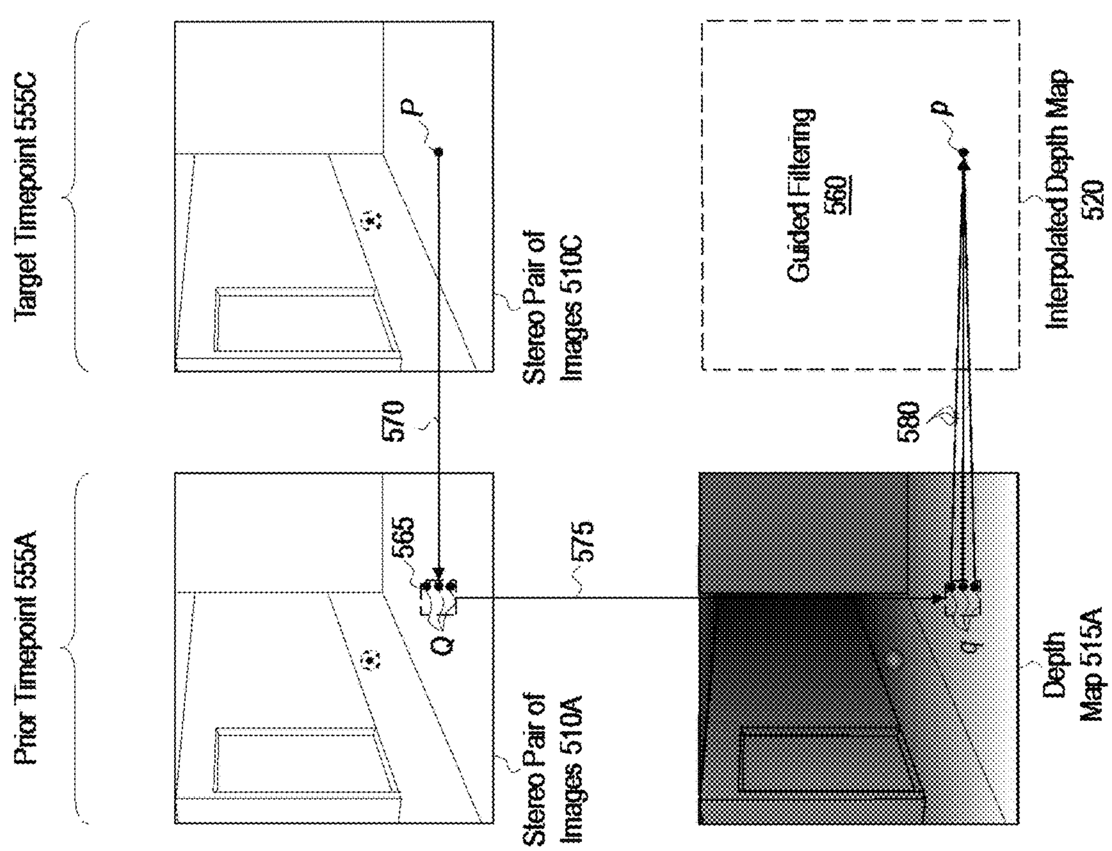
Figure 5C:
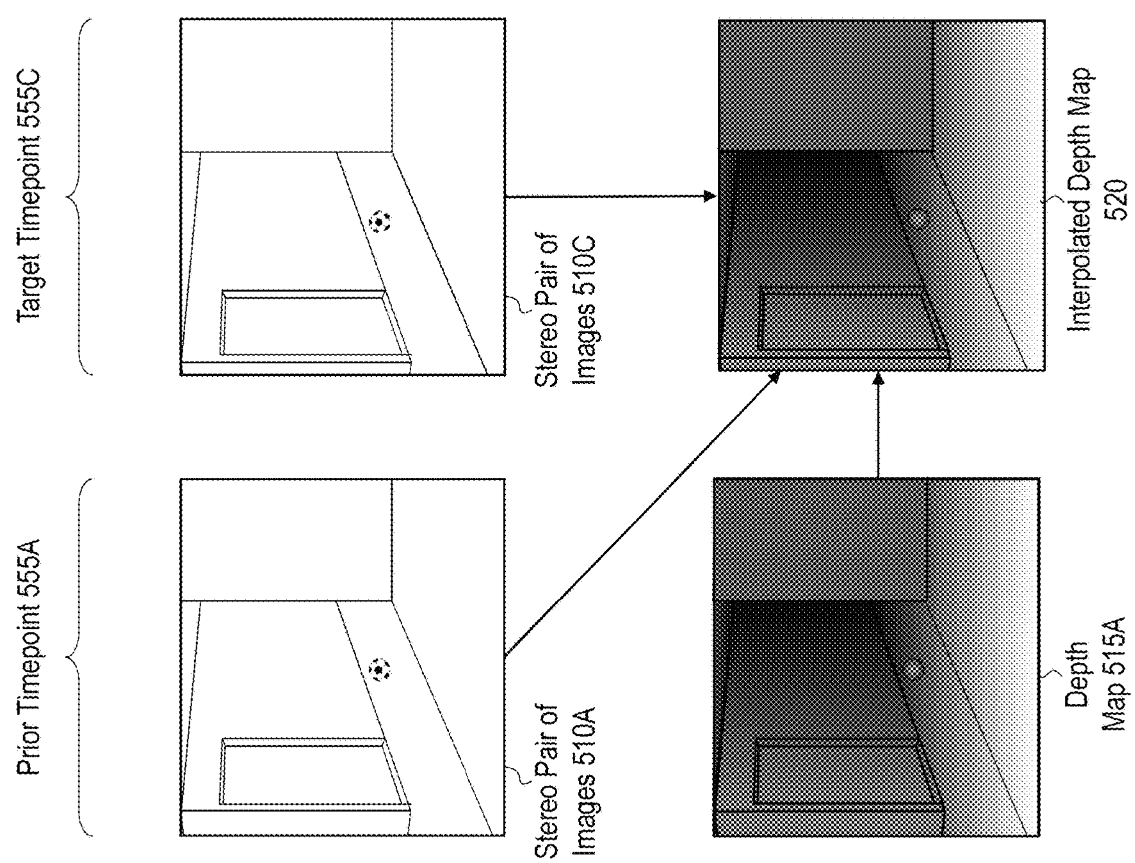

FIG. 5A illustrates a stereo pair of images 510A and a depth map 515A, which are representative, respectively, of stereo pair of images 410A and depth map 415A from FIGS. 4A-4B. Referring briefly to FIGS. 4A and 4B, stereo pair of images 410A and depth map 415A are representative of the environment 405 at a particular timepoint. This timepoint is represented in FIG. 5A as prior timepoint 555A.

FIG. 5A also illustrates a stereo pair of images 510C which is representative of stereo pair of images 410C from FIG. 4B. Referring again briefly to FIGS. 4A and 4B, stereo pair of images 410C is representative of the environment 405 at a timepoint that is subsequent to the timepoint associated with stereo pair of images 410A and depth map 415A. Of note, in FIG. 4B, no depth map was computed for the timepoint associated with stereo pair of images 410C by performing stereo matching or other conventional depth calculations on the stereo pair of images 410C.

The timepoint associated with stereo pair of images 410C (and stereo pair of images 510C) is represented in FIG. 5A as target timepoint 555C. Thus, returning to FIG. 5A, stereo pair of images 510C also represents a timepoint for which no corresponding depth map was computed by stereo matching or other conventional depth calculations. Thus, FIGS.

5A-5C illustrate an example of generating an interpolated depth map 520 for the target timepoint 555C based on a stereo pair of images associated with the target timepoint 555C (i.e., stereo pair of images 510C) and a stereo pair of images and depth map associated with the prior timepoint 555A (i.e., stereo pair of images 510A and depth map 515A). The arrows extending from stereo pair of images 510A, stereo pair of images 510C, and depth map 515A to interpolated depth map 520 in FIG. 5A indicate that, in some instances, a system (e.g., HMD 400) uses image data from stereo pair of images 510C, stereo pair of images 510A, and depth map 515A to generate the interpolated depth map 520.

FIG. 5B illustrates a conceptual representation of generating the interpolated depth map 520 by applying a filter 560. In some implementations, the filter 560 is an edge-preserving filter that uses one or more guidance images. By way of non-limiting example, in some instances, the filter 560 is a joint bilateral filter, a guided filter, a bilateral solver, or any other suitable edge-preserving filter.

In the example shown in FIG. 5B, and as indicated above, the filter 560 is configured to use image data from stereo pair of images 510A (e.g., from at least one image thereof), stereo pair of images 510C (e.g., from at least one image thereof), and the depth map 515A to generate the interpolated depth map 520.

By way of illustrative, non-limiting example, FIG. 5B shows that, in some instances, the filter 560 generates each pixel p of the interpolated depth map 520 as a weighted average of certain pixels of the depth map 515A. In the example of FIG. 5B, for each pixel p of the interpolated depth map 520, the filter 560 identifies a pixel P in stereo pair of images 510C that corresponds to the coordinates of pixel p. In some implementations, because stereo pair of images 510C and the interpolated depth map 520 are both associated with target timepoint 555C, objects represented in the interpolated depth map 520 and stereo pair of images 510C will be aligned. Accordingly, in some instances, pixel P provides a reference starting point for identifying image data associated with prior timepoint 555A to implement for generating pixel p in the interpolated depth map 520.

Based on the intensity and pixel coordinate of pixel P, in some instances, the filter 560 identifies one or more pixels Q in stereo pair of images 510A (associated with prior timepoint 555A) that have a similar pixel coordinate to that of pixel P and a similar intensity value to that of pixel P (as indicated in FIG. 5B by arrow 570). In some instances, the filter 560 identifies similarity of pixel coordinates based on a coordinate range 565 that encompasses the pixel coordinate of pixel P. Although the coordinate range 565 depicted in FIG. 5B is substantially square, one will appreciate, in view of the present disclosure, that a coordinate range for finding one or more pixels Q that have a similar pixel coordinate to that of pixel P may comprise any shape and/or form. For example, in some instances, the coordinate range 565 defines a radius around the pixel coordinate of pixel P within which to search for one or more pixels Q in stereo pair of images 510A.

Furthermore, in some instances, the filter 560 identifies a similarity of intensity for identifying one or more pixels Q within the coordinate range 565 that have an intensity that is similar to that of pixel P based on gray level intensity difference, distance metrics, and/or any suitable similarity function or technique.

In some implementations, based on the pixel coordinates of the one or more pixels Q, the filter 560 identifies one or more pixels q in depth map 515A that have the same pixel coordinate as the one or more pixels Q (as indicated in FIG. 5B by arrow 575). In some instances, because stereo pair of images 510A and depth map 515A are both associated with prior timepoint 555A, objects represented in depth map 515A and stereo pair of images 510A will be aligned. Accordingly, in some instances, the one or more pixels Q provide a reference for identifying one or more pixels q to implement for generating pixel p in the interpolated depth map 520.

In some instances, the filter 560 generates the depth value (e.g., disparity value) for pixel p based on a weighted average of the disparity values of the one or more pixels q from depth map 515A, as indicated in FIG. 5B by the arrows 580 extending from the one or more pixels q in depth map 515A to pixel p in the interpolated depth map 520. In some instances, the weights for determining the weighted average of the one or more pixels q to generate pixel p are based on the intensity similarities between the one or more pixels Q of stereo pair of images 510A and pixel P from stereo pair of images 510C, the pixel coordinate similarities between the one or more pixels Q and pixel P, or a combination thereof.

FIG. 5C depicts an example of the interpolated depth map 520 after all pixels p thereof have been generated using image data from stereo pair of images 510C, stereo pair of images 510A, and depth map 515A (as indicated by the arrows of FIG. 5C). In this regard, at least some disclosed embodiments are configured to generate depth maps (e.g., interpolated depth map 520) for target timepoints (e.g., target timepoint 555C) without performing stereo matching or other conventional depth calculations on stereo pairs of images associated with the target timepoints (e.g., stereo pair of images 510C). Instead, at least some of the disclosed embodiments upsample low temporal resolution depth maps to generate depth maps using an edge-preserving filter that obtains guidance image data (e.g., filter 560). In some implementations, generating depth maps in the manner disclosed according to FIGS. 5A-5C may provide depth maps at a lower computational cost than conventional stereo matching or other depth calculation techniques, thereby enabling high temporal resolution depth map generation.

For simplicity, FIGS. 5A-5C generalize the stereo pairs of images 510A and 510C by only depicting a single image representation of the environment captured by the stereo pairs of images 510A and 510C. However, those skilled in the art will recognize, in view of the present disclosure, that pixel P and/or one or more pixels Q may be part of either image of a stereo pair of images, both images of a stereo pair of images, and/or one or more images derived from a stereo pair of images. In one example, a system generates a left interpolated depth map and a right interpolated depth map—one corresponding to the geometry of a left image of a stereo pair of images and another corresponding to the geometry of a right image of a stereo pair of images for performing per-eye parallax correction (e.g., to provide parallax-corrected pass-through views). In at least one such example, the system identifies each pixel $p_{heft}$ for the left interpolated depth map using $P_{left}$ from a left image of stereo pair of images 510C, $Q_{left}$ from a left image of stereo pair of images 510A, and $q_{left}$ from a left depth map 515A that is also in the geometry of the left image of the stereo pair of images 510A. Similarly, the system identifies each pixel $p_{right}$ for the right interpolated depth map using $P_{right}$ from a right image of stereo pair of images 510C, $Q_{right}$ from a right image of stereo pair of images 510A, and $q_{right}$ from a right depth map 515A that is also in the geometry of the right image of the stereo pair of images 510A.

Figure 6A:
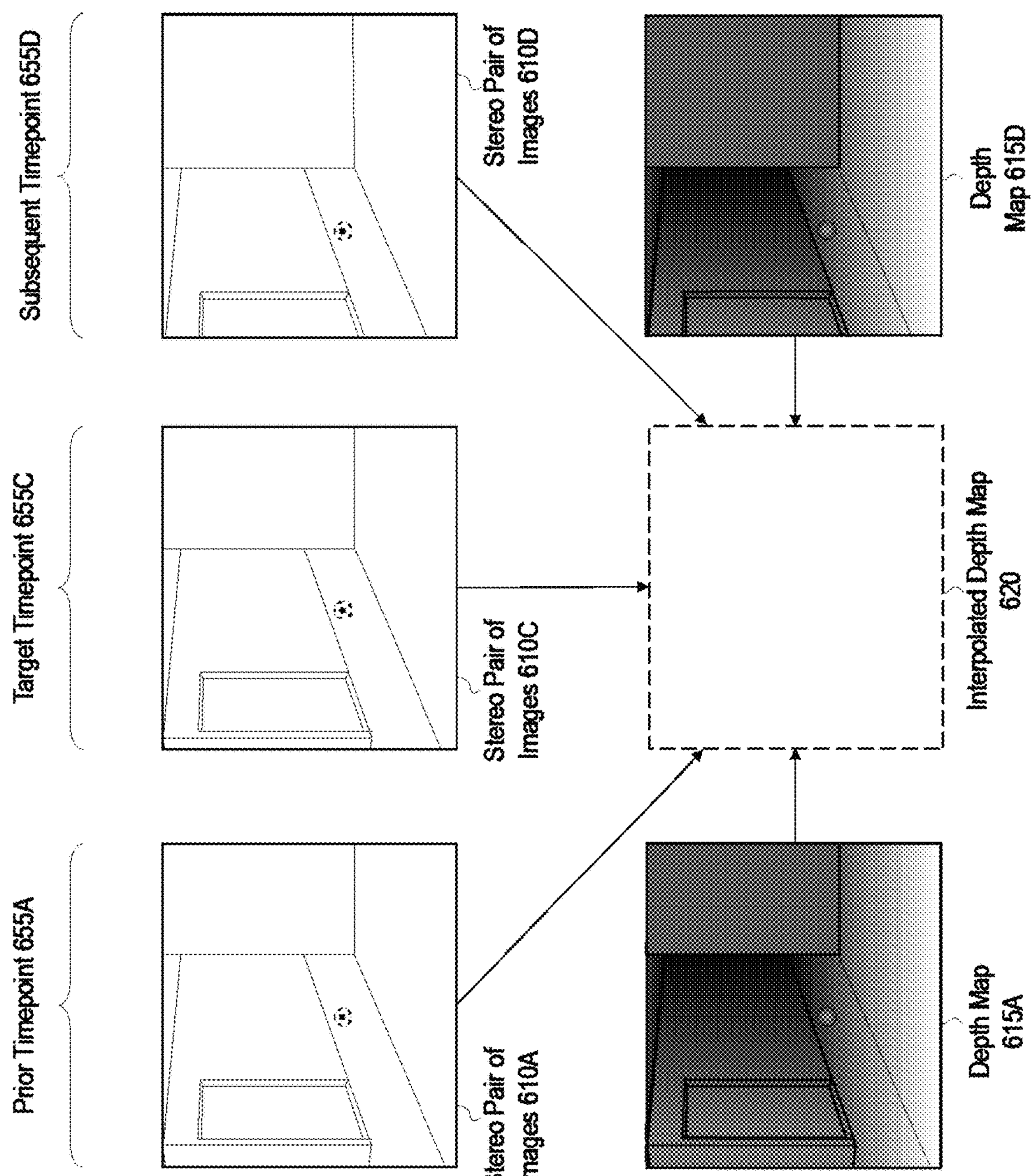
FIGS. 6A-6C illustrate generating an interpolated depth map based on image data from a prior timepoint, a target timepoint, and a subsequent timepoint.
Figure 6B:
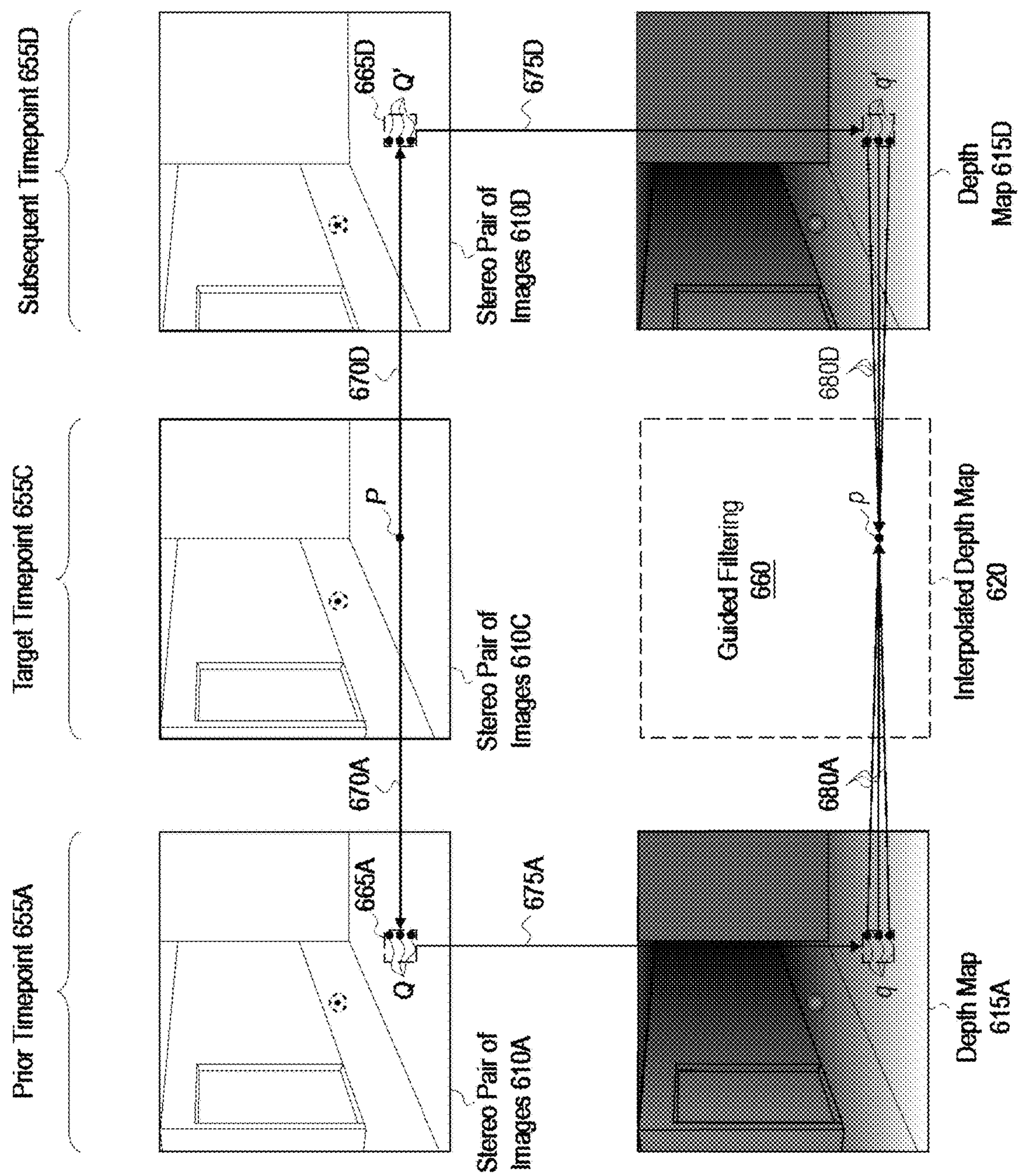
Figure 6C:
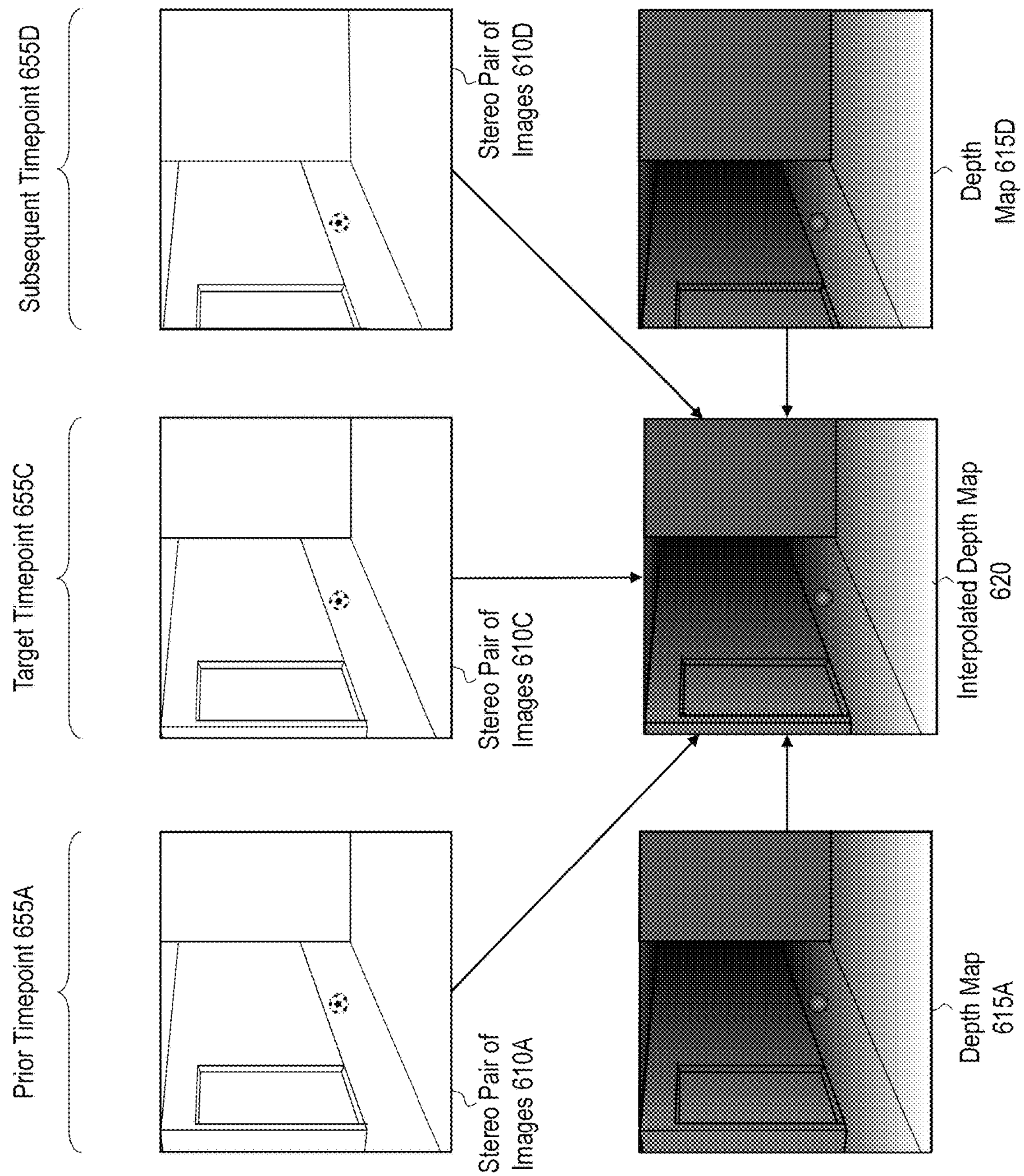

In addition, it should be noted that, in some instances, a filter for generating an interpolated depth map for a target timepoint utilizes image data from more than one other timepoints (e.g., an additional stereo pair of images and an additional depth map). For example, FIGS. 6A-6C illustrate generating an interpolated depth map 620 based on image data from a prior timepoint 655A, a target timepoint 655C, and a subsequent timepoint 655D. Stereo pair of images 610A and depth map 615A are associated with prior timepoint 655A and are representative of stereo pair of images 410A and depth map 415A from FIGS. 4A-4B, respectively. Stereo pair of images 610C is associated with target timepoint 655C and is representative of stereo pair of images 410C from FIG. 4B. Stereo pair of images 610D and depth map 615D are associated with subsequent timepoint 655D and are representative of stereo pair of images 410D and depth map 415D from FIG. 4B, respectively. The arrows directed toward interpolated depth map 620 indicate that, in some instances, interpolated depth map 620 is generated using image data from stereo pairs of images 610A, 610C, and 610D and depth maps 615A and 615D.

Similar to FIG. 5B and the description thereof, FIG. 6B shows that, in some implementations, the interpolated depth map 620 is generated by applying a filter 660 (e.g., an edge-preserving filter that uses guidance image data). By way of illustrative example, FIG. 6B shows that, in some instances, the filter 660 generates each pixel p of the interpolated depth map 620 as a weighted average of certain pixels of depth map 615A and depth map 615D. In the example of FIG. 6B, for each pixel p of the interpolated depth map 620, the filter 660 identifies a pixel P in stereo pair of images 610C that corresponds to the coordinates of pixel p.

Based on the intensity and pixel coordinate of pixel P, in some instances, the filter 660 identifies one or more pixels Q in stereo pair of images 610A (associated with prior timepoint 655A) and one or more pixels Q' in stereo pair of images 610D (associated with subsequent timepoint 655D) that have a similar pixel coordinate to that of pixel P and a similar intensity value to that of pixel P (as indicated in FIG. 6B by arrows 670A and 670D). In some instances, the filter 660 identifies similarity of pixel coordinates based on coordinate ranges 665A and 665D (for stereo pair of images 610A and stereo pair of images 610D, respectively) that encompass the pixel coordinate of pixel P. The filter measures intensity similarity, in some instances, based on gray level intensity difference, distance metrics, and/or any suitable similarity function or technique.

In some implementations, based on the pixel coordinates of the one or more pixels Q, the filter 660 identifies one or more pixels q in depth map 615A that have the same pixel coordinate as the one or more pixels Q (as indicated in FIG. 6B by arrow 675A) Furthermore, based on the pixel coordinates of the one or more pixels Q', the filter identifies one or more pixels q' in depth map 615D that have the same pixel coordinates as the one or more pixels Q' (as indicated in FIG. 6B by arrow 675D).

In some instances, the filter 660 generates the depth value (e.g., disparity value) for pixel p based on a weighted average of the disparity values of the one or more pixels q from depth map 615A and of the one or more pixels q' from depth map 615D, as indicated in FIG. 6B by the arrows 680A and 680D extending from the one or more pixels q in depth map 615A and from the one or more pixels q' in depth map 615D to pixel p in the interpolated depth map 620. In some instances, the weights for determining the weighted average of the one or more pixels q and q' to generate pixel p are based on the intensity similarities of the one or more pixels Q and Q' to pixel P, the pixel coordinate similarities of the one or more pixels Q and Q' and pixel P, or a combination thereof.

FIG. 6C depicts an example of the interpolated depth map 620 after all pixels p thereof have been generated using image data from stereo pair of images 610C, stereo pair of images 610A, depth map 615A, stereo pair of images 610D, and depth map 615D (as indicated by the arrows of FIG. 6C).

For simplicity, similar to FIGS. 5A-5C, FIGS. 6A-6C generalize the stereo pairs of images 610A, 610C, and 610D by only depicting a single image representation of the environment captured by the stereo pairs of images 610A, 610C, and 610D. However, those skilled in the art will recognize, in view of the present disclosure, that pixel P and/or one or more pixels Q and Q' may be part of either image of a stereo pair of images, both images of a stereo pair of images, and/or one or more images derived from a stereo pair of images. Furthermore, similar to FIGS. 5A-5C, in some instances, a system generates left and right interpolated depth maps according to the principles disclosed with reference to FIGS. 6A-6C.

Figure 7A:
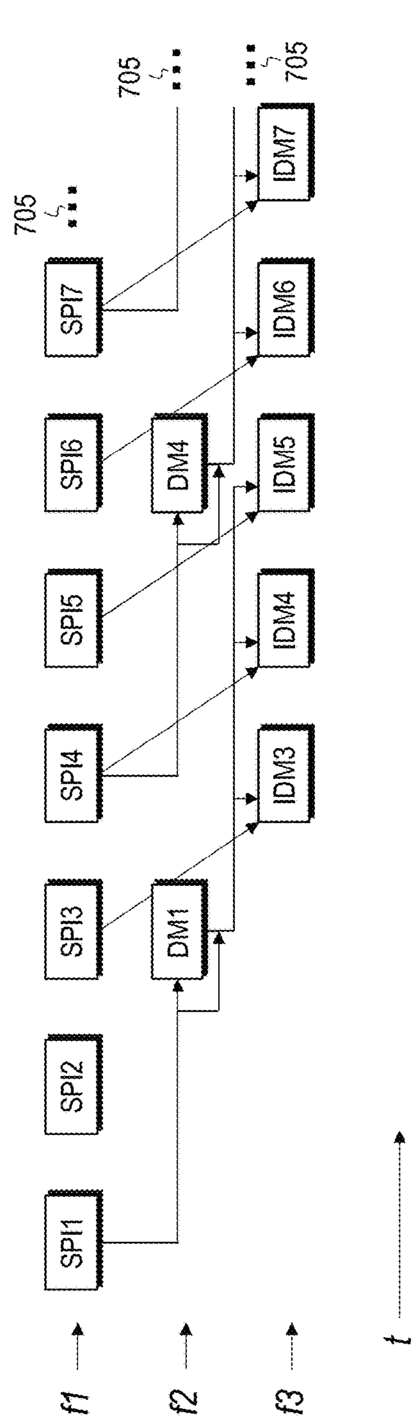
FIG. 7A illustrates generating multiple interpolated depth maps over a period of time based, for each interpolated depth map, on image data from a prior timepoint and a target timepoint.
Figure 7B:
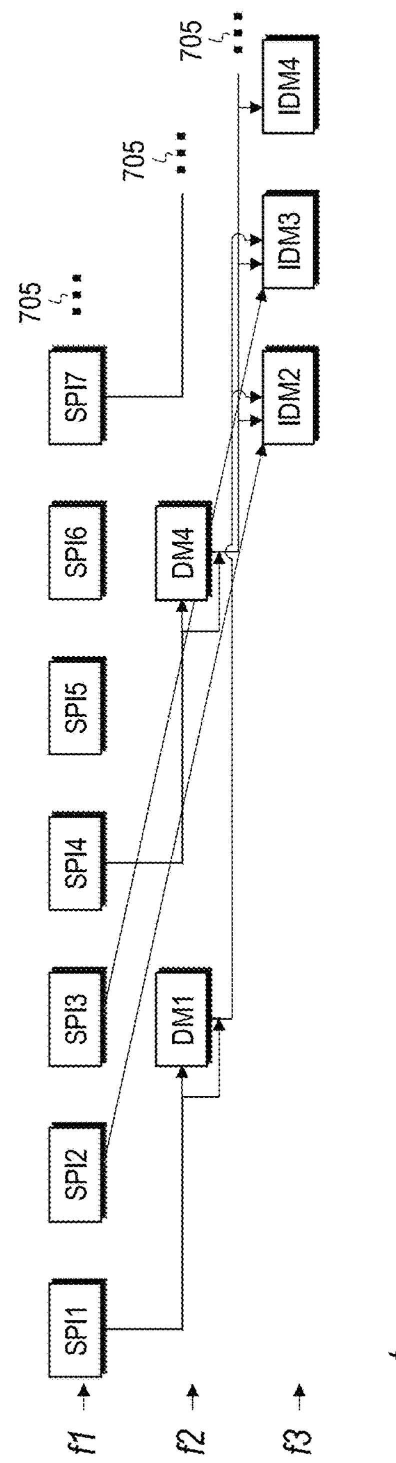
FIG. 7B illustrates generating multiple interpolated depth maps over a period of time based, for each interpolated depth map, on image data from a prior timepoint, a target timepoint, and a subsequent timepoint.
Figure 7C:
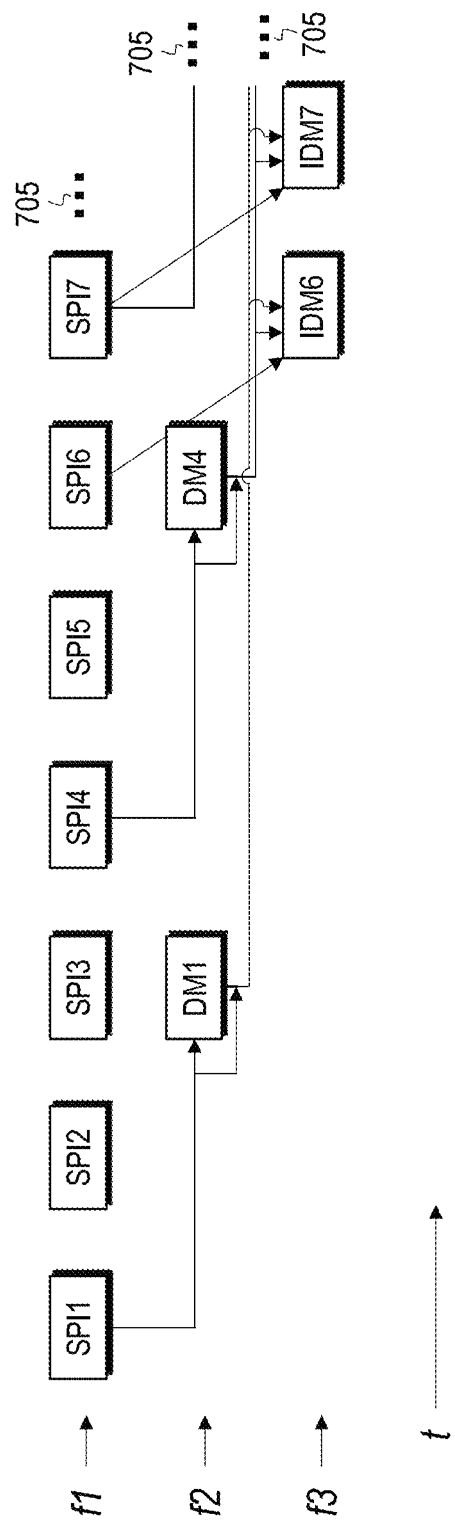
FIG. 7C illustrates generating multiple interpolated depth maps over a period of time based, for each interpolated depth map, on image data from two prior timepoints and a target timepoint.

In FIGS. 7A-7C, the label "SPI" refers to "stereo pair of images," the label "DM" refers to "depth map," and the label "IDM" refers to "interpolated depth map." Furthermore, the number that accompanies each SPI, DM, or IDM label indicates a timepoint with which each SPI, DM, or IDM is associated. Furthermore, the arrows shown in FIGS. 7A-7C extending between the various SPIs, DMs, and IDMs indicate flows of image data for generating the various DMs and IDMs. For example, an arrow extending from an SPI to a DM indicates that the SPI (or at least some image data from the SPI) is used to generate the DM. Furthermore, an arrow extending from an SPI or a DM to an IDM indicates that the SPI or DM (or at least some image data form the SPI or DM) is used for generating the IDM. The ellipses 705 in FIGS. 7A-7C indicate that a system may capture or obtain stereo pairs of images, generate or obtain depth maps, and/or generate interpolated depth maps for any desired interval of time.

FIG. 7A illustrates an implementation of the disclosed principles for generating multiple interpolated depth maps over a period of time based, for each interpolated depth map, on image data from a prior timepoint and a target timepoint. For example, FIG. 7A illustrates IDM3 associated with timepoint 3. According to FIG. 7A, IDM3 is generated using SPI3 and image data associated with a prior timepoint. Specifically, IDM3 is shown as being generated based on SPI1 and DM1, which are associated with a prior timepoint, timepoint 1 (see time axis, t). For example, in some instances, IDM3 is generated according to the principles disclosed with reference to FIGS. 5A-5C.

Furthermore, as demonstrated by FIG. 7A, after generating IDM3, a system may successively generate additional interpolated depth maps. For example, according to FIG. 7A, IDM4 is generated based on SPI4, SPI1, and DM1, and IDM5 is generated based on SPI5, SPI1, and DM 1. IDM6 is illustrated as being generated after depth calculations are completed for generating DM4 based on SPI4, providing more up-to-date depth information for generating IDM6 than DM1. Accordingly, FIG. 7A illustrates that IDM6 is generated based on SPI6, SPI4, and DM4. In this regard, a system (e.g., HMD 400) may utilize a most recently computed depth map and its underlying stereo pair of images for generating an interpolated depth map. IDM7 is also illustrated as being generated based on SPI4, and DM4 (and SPI7).

As illustrated in FIG. 7A, in some implementations, a system (e.g., HMD 400) performs operations of successively obtaining or capturing stereo pairs of images, successively generating or obtaining depth maps (e.g., by stereo matching), and successively generating interpolated depth maps at different frequencies. For example, FIG. 7A illustrates that a system (e.g., HMD 400) captures stereo pairs of images at a first frequency f1 and generates depth maps by performing depth calculations (e.g., stereo matching) on at least some of the captured stereo pairs of images at a second frequency f2. FIG. 7A shows that the second frequency f2 is less than the first frequency f1, in particular because of the computational burden associated with performing conventional depth calculations. However, as depicted in FIG. 7A, a system generates interpolated depth maps at a third frequency f3 that is greater than the second frequency f2, in particular because generating an interpolated depth map according to the principles described herein is, in some instances, significantly less computationally expensive than conventional depth calculations (e.g., stereo matching).

As depicted in FIG. 7A, the third frequency f3 is equal to the first frequency f1 at which the system obtains or captures stereo pairs of images (e.g., f3=f1=90 Hz). This configuration is, however, provided as an example only. In other examples, the third frequency f3 takes on any frequency equal to or less than the first frequency f1 and equal to or greater than the second frequency f2.

FIG. 7B illustrates generating multiple interpolated depth maps over a period of time based, for each interpolated depth map, on image data from a prior timepoint, a target timepoint, and a subsequent timepoint (e.g., according to the principles disclosed with reference to FIGS. 6A-6C). For example, as shown in FIG. 7B, IDM2 is generated based on SPI2 (of the target timepoint), SPI1 and DM1 (of a prior timepoint), and SPI4 and DM4 (of a subsequent timepoint). Similarly, FIG. 7B shows that IDM3 is generated based on SPI3 (of the target timepoint), SPI1 and DM1 (of a prior timepoint), and SPI4 and DM4 (of a subsequent timepoint).

In addition, FIG. 7B illustrates that, in some instances, a system uses different operations for generating an interpolated depth map at different timepoints. For example, IDM4 of FIG. 7B corresponds to timepoint 4, which is a timepoint for which a depth map was generated by stereo matching (i.e., DM4). In some embodiments, where a depth map was generated by stereo matching for the target timepoint, the system defines the pixels of an interpolated depth map (e.g., IDM4) as the pixels of the depth map that was generated by stereo matching. Put differently, in some instances, the system uses an available depth map that was generated by stereo matching for some timepoints (e.g., frames) without applying a filter to generate an interpolated depth map (e.g., filter 660 from FIG. 6B or filter 560 from FIG. 5B).

In another example, a system (e.g., HMD 400) generates an interpolated depth map for a target timepoint that has an available depth map (e.g., generated by stereo matching) by applying an edge-preserving filter that uses the stereo pair of images that was used to generate the available depth map (while refraining from using stereo pairs of images associated with other timepoints). For example, FIG. 7B shows that IDM4 is generated based only DM4 and SPI4, without reference to image data of other timepoints. In some instances, a system generates IDM4 by applying an edge-preserving filter to DM4 using SPI4 for guidance image data (e.g., to sharpen depth borders). In this regard, a system (e.g., HMD 400) may apply different techniques for generating different interpolated depth maps for different timepoints.

FIG. 7C illustrates an example implementation that includes generating multiple interpolated depth maps over a period of time based, for each interpolated depth map, on image data from two prior timepoints and a target timepoint. For example, in FIG. 7C, IDM6 is generated based on SPI6 (of the target timepoint), SPI4 and DM4 (of a prior timepoint), and SPI1 and DM1 (of an earlier prior timepoint). Similarly, IDM7 is generated based on SPI7 (of the target timepoint), SPI4 and DM4 (of a prior timepoint), and SPI1 and DM1 (of an earlier prior timepoint). In some instances, utilizing image data from multiple different timepoints (e.g., two or more prior timepoints, one or more prior timepoints and one or more subsequent timepoint, etc.) to generate an interpolated depth map increases the quality and/or accuracy of the interpolated depth map.

Although FIGS. 7A-7C illustrate instances in which the frequencies f1, f2, and f3 do not vary over time, it should be noted that, in some instances, a system (e.g., HMD 400) dynamically updates any of the frequencies f1, f2, and/or f3 based on detected triggering conditions.

Figure 8:
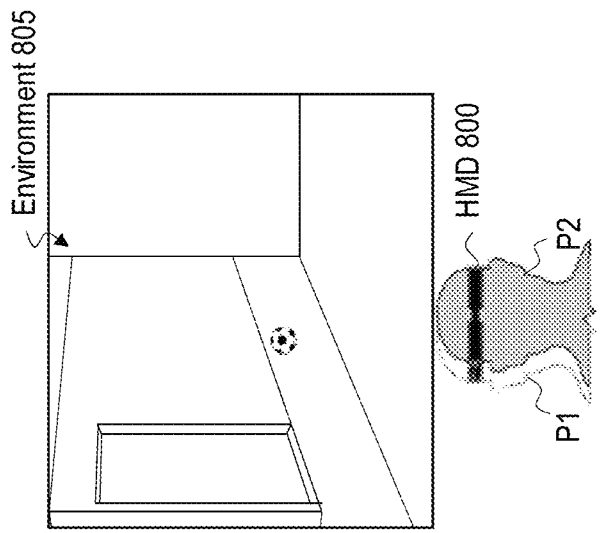
FIGS. 8 and 9 illustrate example triggering conditions for selectively altering a depth map generation frequency.
Figure 8:
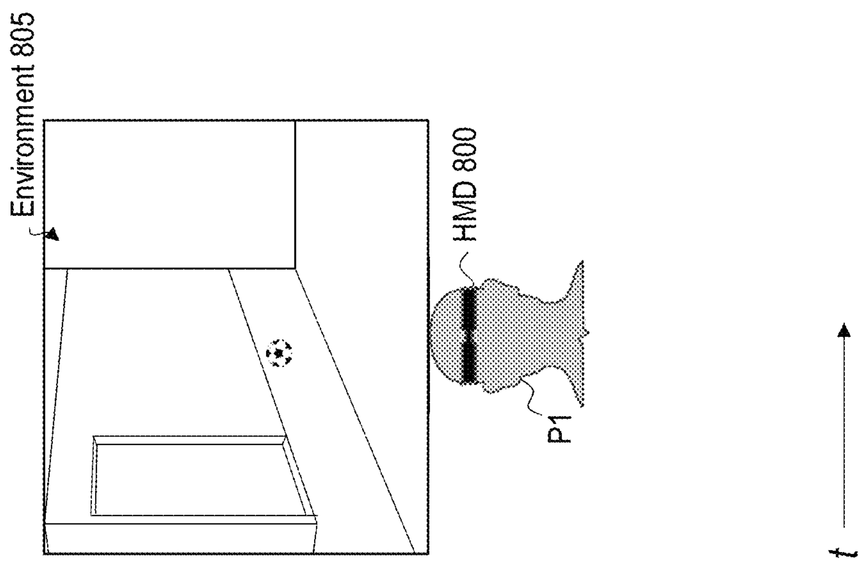
Figure 9:
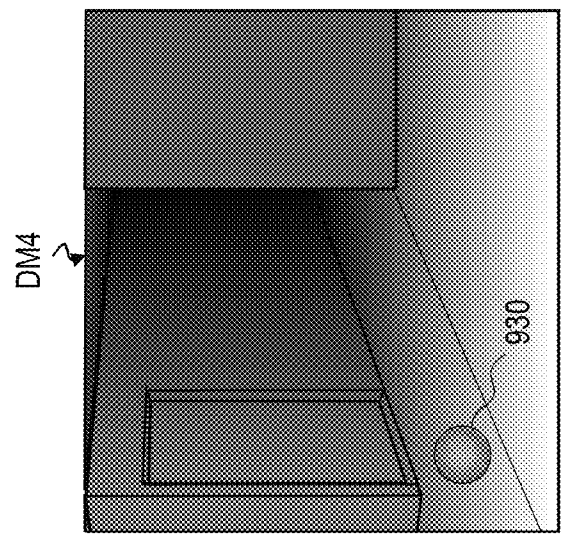
Figure 9:
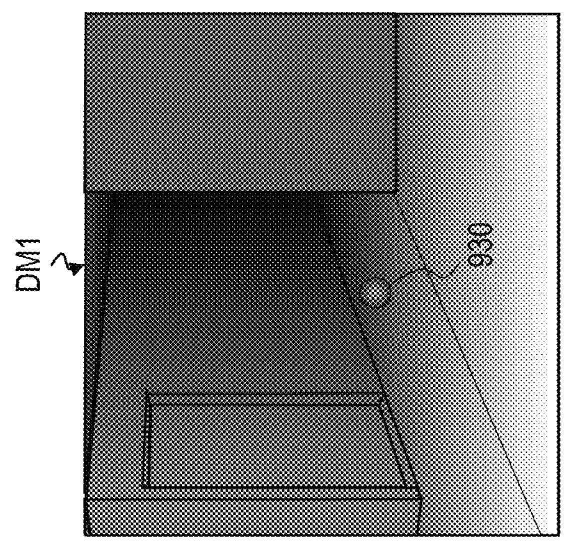

FIGS. 8 and 9 illustrate example triggering conditions for selectively altering a depth map generation frequency (e.g., the second frequency f2 from FIGS. 7A-7C). Attention is first directed to FIG. 8, which illustrates an HMD 800 capturing an environment 805 from different poses (e.g., a first pose P1 and a second pose P2). HMD 800 illustrated in FIG. 8 is representative of HMD 200 from FIG. 2 described hereinabove.

In some embodiments, an HMD 800 (or another system) dynamically updates the frequency of depth map generation (e.g., second frequency f2 from FIGS. 7A-7C) based on a change in the pose of the HMD 800 relative to the environment 805 over time, such as a change from a first pose P1 to a second pose P2 (e.g., according to time axis t). The HMD 800 may detect a change in the pose of the HMD 800 with respect to the environment 805 in a variety of ways. For example, in some instances, the HMD 800 obtains pose data based on inertial tracking data and visual tracking data obtained by various sensors 250 of the HMD 800 (e.g., under visual-inertial SLAM).

A change in the pose of the HMD 800 may cause portions of real-world objects that were not previously visible to the user to become visible according to the user's new perspective. Therefore, in some implementations, the HMD 800 increases the frequency with which the HMD 800 generates depth maps in response to detecting a change in the pose of the HMD 800 (e.g., in order to more accurately capture the changes in the user's perspective/perception of the real-world environment).

Additionally, or alternatively, the HMD 800 may detect changes in the position of the HMD 800 relative to an environment based on changes in the depth maps over time. A difference in the depth information of two sequentially generated depth maps may also indicate that the perspective of the HMD 800 is changing with respect to at least a portion of the real-world environment. For instance, a difference in depth information between consecutively generated depth maps may indicate that objects in the environment are moving with respect to the HMD 800, which may trigger an increase in the frequency at which the HMD 800 generates depth maps (e.g., to more frequently update depth information for the moving objects in the environment).

In some embodiments, the frequency at which the HMD 800 generates depth maps is set or is modified in response to detecting a particular velocity of the HMD that meets and/or exceeds one or more corresponding velocity attributes (e.g., speed and/or direction).

By way of example, FIG. 9 illustrates a first depth map DM1 and a second depth map DM4 (e.g., representative of DM1 and DM4 from FIGS. 7A-7C). The depth maps illustrated in FIG. 9 may be generated by HMD 800 from FIG. 8. As shown in FIG. 9, the HMD 800 generates the second depth map DM4 after generating the first depth map DM1 (e.g., according to time axis t).

As illustrated, differences exist in the depth information shown in the second depth map DM4 as compared with the first depth map DM1. For example, the position of the ball 930 is different in the second depth map DM4 as compared with the first depth map DM1, which may indicate that the ball 930 is moving with respect to the HMD 800 (e.g., where the pose of the HMD 800 changing (or not changing) in a manner that indicates that the ball 930 is moving with respect to the user). In some instances, upon detecting this difference (e.g., by identifying movement of segmented objects, pixel comparisons between the depth maps, etc.), the HMD 800 selectively increases the frequency at which the HMD 800 captures depth maps in order to more frequently update depth information for the moving objects in the environment (e.g., the ball 930).

Similarly, an HMD 800 may also determine that a new real-world object is present in an updated depth map that was not present in a previously obtained depth map and therefore increase or decrease the depth map acquisition frequency. Also, an HMD 800 may also determine that a previously present real-world object is no longer present in an updated depth map that was present in a previously obtained depth map and therefore increase or decrease the depth map generation frequency.

Furthermore, those skilled in the art will recognize, in view of the present disclosure, that the HMD 800 may selectively decrease the frequency at which the HMD 800 generates depth maps based on any of the criteria described hereinabove, such as detecting, by pose data, that a position of the HMD 800 relative to the real-world environment ceases to change and/or has a low (or decreasing) rate of change, and/or detecting a lack of differences (or a slow rate of changing) between consecutively generated depth maps. Also, it should be noted that other triggering conditions not explicitly depicted in FIGS. 8 and 9 are within the scope of this disclosure. For example, an HMD may selectively lower the frequency for generating depth maps based on a battery consumption profile in order to conserve battery power. The frequency for generating depth maps may also be selectively and/or automatically determined for the HMD based on user input and/or in response to detecting other environmental conditions (e.g., during certain times of the day and/or in certain location) and/or use conditions (e.g., a use of the HMD during gaming and/or during a first responder application).

Example Method(s) for Upsampling Low Temporal Resolution Depth Maps

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
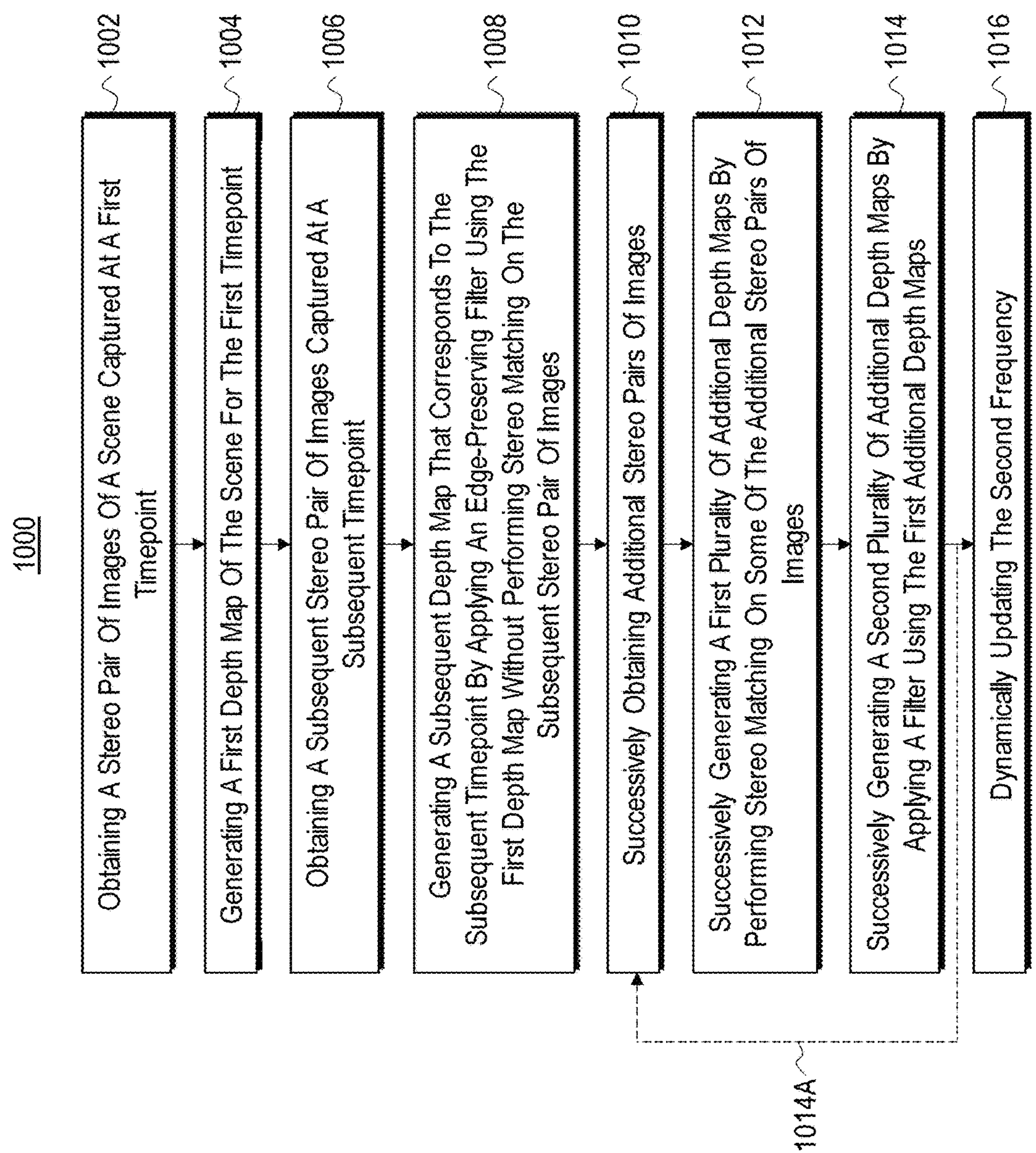
FIG. 10 illustrates an example flow diagram depicting a method for upsampling low temporal resolution depth maps.

FIG. 10 illustrates an example flow diagram 1000 that depicts various acts associated with upsampling low temporal resolution depth maps, as disclosed herein. The discussion of the various acts represented in flow diagram 1000 includes references to various hardware components described in more detail with reference to FIGS. 2 and 11.

The first illustrated act is an act of obtaining a stereo pair of images of a scene captured at a first timepoint (act 1002). Act 1002 is performed, in some instances, utilizing scanning sensor(s) 205 of an HMD 200 (see FIG. 2), such as a stereo camera pair comprising any combination of visible light camera(s) 210, low light camera(s) 215, thermal imaging camera(s) 220, UV camera(s) 225, and/or other cameras. In some instances, the stereo pair of images includes a left image and a right image that share an overlapping region in which both the left image and the right image capture common portions of an environment.

The second illustrated act is an act of generating a first depth map of the scene for the first timepoint (act 1004). In some instances, act 1004 is performed utilizing one or more processors of a computer system (e.g., processor(s) 1105 of computer system 1100 shown in FIG. 11). In some instances, the first depth map is generated by performing stereo matching on the stereo pair of images obtained according to act 1002.

The third illustrated act is an act of obtaining a subsequent stereo pair of images captured at a subsequent timepoint (act 1006). Act 1006 is performed, in some instances, utilizing scanning sensor(s) 205 of an HMD 200 (see FIG. 2), such as a stereo camera pair. In some instances, the subsequent stereo pair of images and the stereo pair of images (obtained according to act 1002) are obtained by the same stereo camera pair.

The fourth illustrated act is an act of generating a subsequent depth map that corresponds to the subsequent timepoint by applying an edge-preserving filter using the first depth map without performing stereo matching on the subsequent stereo pair of images (act 1008). Act 1008 is performed, in some instances, utilizing one or more processors of a computer system (e.g., processor(s) 1105 of computer system 1100 shown in FIG. 11).

The edge-preserving filter may comprise various forms, such as a joint bilateral filter, a guided filter, a bilateral solver, or any edge-preserving filtering technique that uses guidance image data.

In some instances, the edge-preserving filter generates each pixel of the subsequent depth map as a weighted average of a group of pixels in the first depth map. In some instances, a group of pixels of the first depth map is identified based on sharing pixel coordinates with a group of pixels of the stereo pair of images that are similar in intensity and/or pixel coordinates to a particular pixel of the subsequent stereo pair of images. The particular pixel of the subsequent stereo pair of images is one that shares pixel coordinates with the pixel to be generated for the subsequent depth map (see FIGS. 5A-5C and the attendant description).

In some implementations, the edge-preserving filter utilizes additional image data to generate the subsequent depth map. For example, in some instances, the edge-preserving filter utilizes at least some data of an additional stereo pair of images and an additional depth map to generate the subsequent depth map. In some instances, the additional stereo pair of images and the additional depth map are associated with a timepoint that is subsequent to the subsequent timepoint. In other instances, the additional stereo pair of images and the additional depth map are associated with a timepoint that is prior to the first timepoint. In yet other instances, multiple additional stereo pairs of images and additional depth maps are used, such as a combination of stereo pairs of images and depth maps that are associated with a timepoint that is prior to the first timepoint and stereo pairs of images and depth maps that are associated with a timepoint that is subsequent to the subsequent timepoint.

In some instances, the filtering operations/functions implement an edge-preserving filter that uses guidance image data, such as image data from one or more images of a downsampled stereo pair of images or of an originally captured stereo pair of images. For example, the guidance data may be obtained from a (downsampled) stereo pair of images with an image size or pixel resolution that is greater than that of the previously generated depth map upon which the upsampling functions/operations are performed.

The fifth illustrated act is an act of successively obtaining additional stereo pairs of images (act 1010). Act 1010 is performed, in some instances, utilizing scanning sensor(s) 205 of an HMD 200 (see FIG. 2), such as a stereo camera pair. In some instances, the additional stereo pairs of images and the subsequent stereo pair of images (obtained according to act 1006) are obtained by the same stereo camera pair. Furthermore, in some instances, the additional stereo pairs of images are obtained at a first frequency, such as a frequency of 90 Hz or another value within a range of 45 Hz to 180 Hz or another value outside of the aforementioned range.

The sixth illustrated act is an act of successively generating a first plurality of additional depth maps by performing stereo matching on some of the additional stereo pairs of images (act 1012). In some instances, act 1012 is performed utilizing one or more processors of a computer system (e.g., processor(s) 1105 of computer system 1100 shown in FIG. 11). In some instances, the first plurality of additional depth maps is generated by performing stereo matching on at least some of the additional stereo pairs of images obtained according to act 1010. Furthermore, in some instances, the additional depth maps of the first plurality of additional depth maps are generated at a second frequency, such as a frequency of 30 Hz or another value within a range of 15 Hz to 90 Hz or another value outside of the aforementioned range.

The seventh illustrated act is an act of successively generating a second plurality of additional depth maps by applying a filter using the first additional depth maps (act 1014). In some instances, act 1014 is performed utilizing one or more processors of a computer system (e.g., processor(s) 1105 of computer system 1100 shown in FIG. 11). In some embodiments, the second plurality of additional depth maps are generated, using the first plurality of additional depth maps and the additional stereo pairs of images, in the same manner as for generating the subsequent depth map of act 1008 (e.g., wherein the filter is an edge-preserving filter). Furthermore, in some instances, the additional depth maps of the second plurality of additional depth maps are generated at a third frequency, such as a frequency of 90 Hz or another value within a range of 45 Hz to 180 Hz or another value outside of the aforementioned range. In some implementations, the third frequency is equal to the first frequency (i.e., the frequency for obtaining additional stereo pairs of images, according to act 1010).

The dashed arrow 1014A indicates that acts 1010, 1012, and 1014 are, in some instances, performed iteratively. In some instances, after obtaining additional stereo pairs of images (according to act 1010), a first plurality of additional depth maps (according to act 1012), and a second plurality of additional depth maps (according to act 1014), a system (e.g., computer system 1100) obtains more additional stereo pairs of images and first and second pluralities of additional depth maps.

The eighth illustrated act is an act of dynamically updating the second frequency (act 1016). In some instances, act 1016 is performed utilizing one or more processors of a computer system (e.g., processor(s) 1105 of computer system 1100 shown in FIG. 11) based on data obtained by one or more sensors of the computer system (e.g., sensor(s) 250 from FIG. 2, sensor(s) 1140 and/or 1165 from FIG. 11). In some implementations, the second frequency is updated based on a change in position of a system (e.g., an HMD) relative to an environment or scene. In some embodiments, a change in the position of the system with respect to the environment is determined based on tracking data obtained by a head tracking system. Additionally, or alternatively, a change in the position of the system with respect to the environment is determined based on a difference between at least two depth maps generated by the system.

Example Computer System(s)

Figure 11:
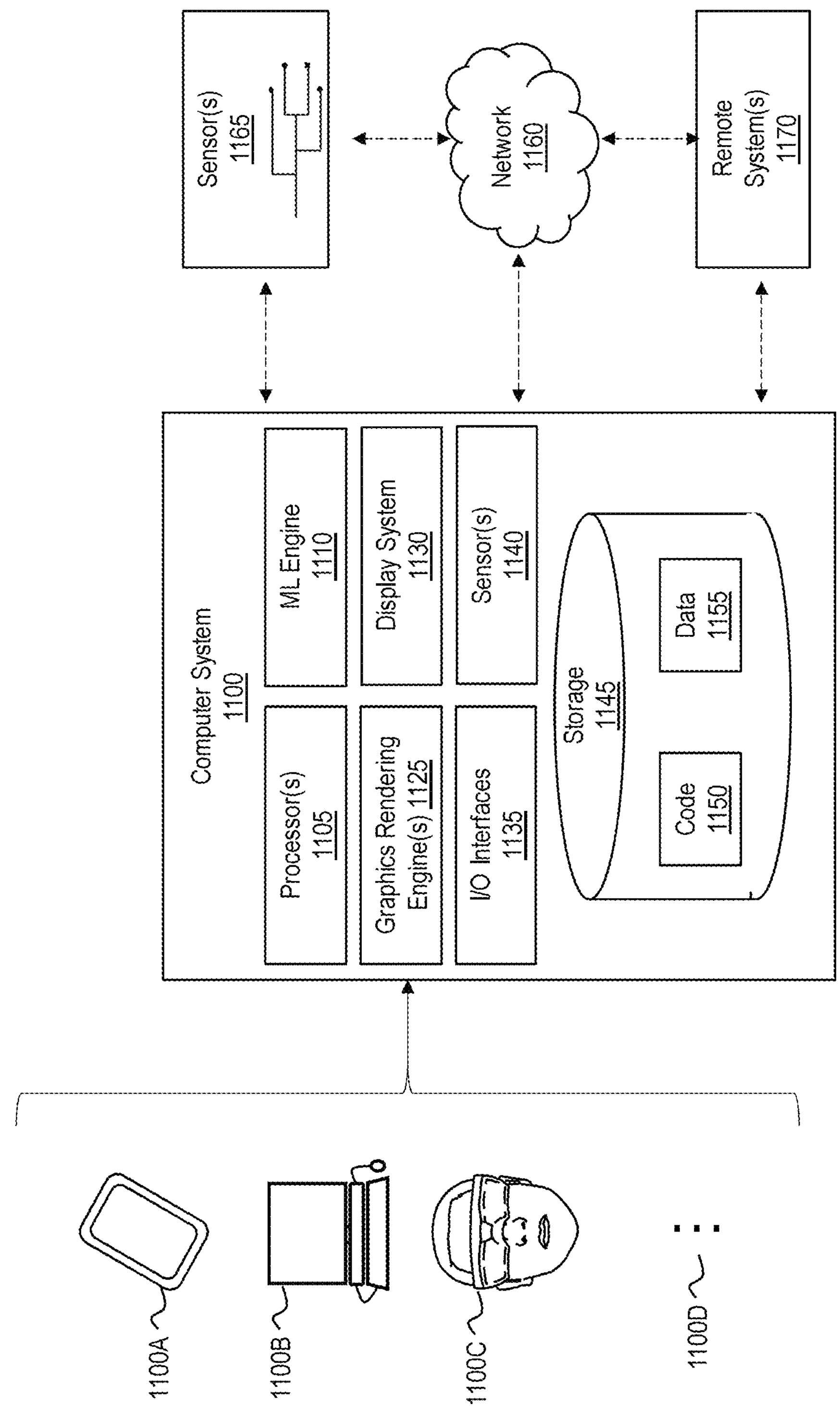
FIG. 11 illustrates an example computer system that may include and/or be used to perform disclosed embodiments.

Having just described the various features and functionalities of some of the disclosed embodiments, the focus will now be directed to FIG. 11 which illustrates an example computer system 1100 that may include and/or be used to facilitate the embodiments described herein, including the acts described in reference to FIG. 10. In particular, this computer system 1100 may be implemented as part of a mixed-reality HMD, such as the HMD referenced herein.

Computer system 1100 may take various different forms. For example, computer system 1100 may be embodied as a tablet, a desktop, a laptop, a mobile device, a cloud device, an HMD, or a standalone device, such as those described throughout this disclosure. Computer system 1100 may also be a distributed system that includes one or more connected computing components/devices that are in communication with computer system 1100. FIG. 11 specifically calls out how computer system 1100 may be embodied as a tablet 1100A, a laptop 1100B, or an HMD 1100C, but the ellipsis 1100D illustrates how computer system 1100 may be embodied in other forms as well.

The computer system 1100 includes various different components. FIG. 11 shows that computer system 1100 includes one or more processors 1105 (aka a "hardware processing unit"), a machine learning (ML) engine 1110, graphics rendering engine(s) 1125, a display system 1130, input/output (I/O) interfaces 1135, one or more sensors 1140, and storage 1145.

Regarding the processor(s) 1105, it will be appreciated that the functionality described herein can be performed, at least in part, by one or more hardware logic components (e.g., the processor(s) 1105). For example, and without limitation, illustrative types of hardware logic components/processors that can be used include Field-Programmable Gate Arrays ("FPGA"), Program-Specific or Application-Specific Integrated Circuits ("ASIC"), Application-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1100. The different components, modules, engines, and services described herein may be implemented as objects or processors that execute on computer system 1100 (e.g. as separate threads).

The ML engine 1110 may be implemented as a specific processing unit (e.g., a dedicated processing unit as described earlier) configured to perform one or more specialized operations for the computer system 1100. The ML engine 1110 (or perhaps even just the processor(s) 1105) can be configured to perform any of the disclosed method acts or other functionalities.

In some instances, the graphics rendering engine 1125 is configured, with the hardware processing unit 1105, to render one or more virtual objects within the scene. As a result, the virtual objects accurately move in response to a movement of the user and/or in response to user input as the user interacts within the virtual scene. The computer system 1100 may include a display system 1130 (e.g., laser diodes, light emitting diodes (LEDs), microelectromechanical systems (MEMS), mirrors, lens systems, diffractive optical elements (DOES), display screens, and/or combinations thereof) for presenting virtual objects within the scene.

I/O interface(s) 1135 includes any type of input or output device. Such devices include, but are not limited to, touch screens, displays, a mouse, a keyboard, a controller, and so forth. Any type of input or output device should be included among I/O interface(s) 1135, without limitation.

During use, a user of the computer system 1100 is able to perceive information (e.g., a mixed-reality environment) through a display screen that is included among the I/O interface(s) 1135 and that is visible to the user. The I/O interface(s) 1135 and sensors 1140/1165 may also include gesture detection devices, eye tracking systems, and/or other movement detecting components (e.g., head tracking cameras, depth detection systems, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The computer system 1100 may also be connected (via a wired or wireless connection) to external sensors 1165 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses.

Storage 1145 may be physical system memory, which may be volatile, non-volatile, or some combination of the two. The term "memory" may also be used herein to refer to non-volatile mass storage such as physical storage media. If computer system 1100 is distributed, the processing, memory, and/or storage capability may be distributed as well.

Storage 1145 is shown as including executable instructions (i.e. code 1150). The executable instructions (i.e. code 1150) represent instructions that are executable by the processor(s) 1105 of computer system 1100 to perform the disclosed operations, such as those described in the various methods. Storage 1145 is also shown as including data 1155. Data 1155 may include any type of data, including image data, depth data, pose data, tracking data, and so forth, without limitation.

The disclosed embodiments may comprise or utilize a special-purpose or general-purpose computer including computer hardware, such as, for example, one or more processors (such as processor(s) 1105) and system memory (such as storage 1145), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1100 may also be connected (via a wired or wireless connection) to external sensors (e.g., one or more remote cameras) or devices via a network 1160. For example, computer system 1100 can communicate with any number devices or cloud services to obtain or process data. In some cases, network 1160 may itself be a cloud network. Furthermore, computer system 1100 may also be connected through one or more wired or wireless networks 1160 to remote/separate computer systems(s) 1170 that are configured to perform any of the processing described with regard to computer system 1100.

A "network," like network 1160, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1100 will include one or more communication channels that are used to communicate with the network 1160. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for upsampling low temporal resolution depth maps to provide depth maps at low computational cost, comprising:

one or more processors; and one or more hardware storage devices having stored computer-executable instructions that are operable, when executed by the one or more processors, to cause the system to:

obtain a stereo pair of images of a scene captured at a first timepoint;

generate a first depth map of the scene for the first timepoint by performing stereo matching on the stereo pair of images;

obtain a subsequent stereo pair of images captured at a subsequent timepoint to the first timepoint; and generate a subsequent depth map that corresponds to the subsequent timepoint by applying an edge-preserving filter using the first depth map without performing stereo matching on the subsequent stereo pair of images, thereby reducing computational cost associated with generating the subsequent depth map, wherein the edge-preserving filter utilizes (i) the first depth map, (ii) least one image of the stereo pair of images, (iii) at least one image of the subsequent stereo pair of images, and (iv) an additional depth map or at least one image of an additional stereo pair of images to generate the subsequent depth map.

2. The system of claim 1, further comprising:

a stereo pair of cameras, wherein the stereo pair of cameras captures the stereo pair of images and the subsequent stereo pair of images.

3. The system of claim 1, wherein the edge-preserving filter is a joint bilateral filter.

4. The system of claim 1, wherein the additional stereo pair of images and the additional depth map are associated with a timepoint subsequent to the subsequent timepoint.

5. The system of claim 1, wherein the additional stereo pair of images and the additional depth map are associated with a timepoint prior to the first timepoint.

6. The system of claim 1, wherein the computer-executable instructions are further operable, when executed by the one or more processors, to cause the system to:

successively obtain a plurality of additional stereo pairs of images at a first frequency; and successively generate a first plurality of additional depth maps at a second frequency by performing stereo matching on some additional stereo pairs of images of the plurality of additional stereo pairs of images.

7. The system of claim 6, wherein the computer-executable instructions are further operable, when executed by the one or more processors, to cause the system to:

successively generate a second plurality of additional depth maps at the first frequency by applying an edge-preserving filter using the additional depth maps of the first plurality of additional depth maps.

8. The system of claim 6, wherein the first frequency is within a range of 45 to 90 Hz and the second frequency is within a range of 15 to 30 Hz.

9. The system of claim 8, wherein the second frequency is dynamically updated based on a change in a position of the system relative to the scene.

10. The system of claim 9, wherein the change in the position of the system relative to the scene is based on tracking data that indicate a pose of the system.

11. The system of claim 9, wherein the change in the position of the system relative to the scene is based on a difference between at least two depth maps of the second plurality of additional depth maps.

12. The system of claim 1, wherein the computer-executable instructions are further operable, when executed by the one or more processors, to cause the system to:

reproject depth points based on the subsequent depth map to correspond to a user perspective.

13. A method for upsampling low temporal resolution depth maps to provide depth maps at low computational cost, comprising:

obtaining a stereo pair of images of a scene captured at a first timepoint;

generating a first depth map of the scene for the first timepoint by performing stereo matching on the stereo pair of images;

obtaining a subsequent stereo pair of images captured at a subsequent timepoint to the first timepoint; and generating a subsequent depth map that corresponds to the subsequent timepoint by applying an edge-preserving filter using the first depth map without performing stereo matching on the subsequent stereo pair of images, thereby reducing computational cost associated with generating the subsequent depth map, wherein the edge-preserving filter utilizes (i) the first depth map, (ii) least one image of the stereo pair of images, (iii) at least one image of the subsequent stereo pair of images, and (iv) an additional depth map or at least one image of an additional stereo pair of images to generate the subsequent depth map.

14. The method of claim 13, wherein the additional stereo pair of images and the additional depth map are associated with a timepoint subsequent to the subsequent timepoint.

15. The method of claim 13, wherein the additional stereo pair of images and the additional depth map are associated with a timepoint prior to the first timepoint.

16. The method of claim 13, further comprising:

successively obtaining a plurality of additional stereo pairs of images at a first frequency; and successively generating a first plurality of additional depth maps at a second frequency by performing stereo matching on some additional stereo pairs of images of the plurality of additional stereo pairs of images.

17. The method of claim 16, further comprising:

successively generating a second plurality of additional depth maps at the frequency by applying an edge-preserving filter using the additional depth maps of the first plurality of additional depth maps.

18. One or more hardware storage devices having stored thereon computer-executable instructions, the computer-executable instructions being executable by one or more processors of a computer system to cause the computer system to:

obtain a stereo pair of images of a scene captured at a first timepoint;

generate a first depth map of the scene for the first timepoint by performing stereo matching on the stereo pair of images;

obtain a subsequent stereo pair of images captured at a subsequent timepoint to the first timepoint; and generate a subsequent depth map that corresponds to the subsequent timepoint by applying an edge-preserving filter using the first depth map without performing stereo matching on the subsequent stereo pair of images, thereby reducing computational cost associated with generating the subsequent depth map, wherein the edge-preserving filter utilizes (i) the first depth map, (ii) least one image of the stereo pair of images, (iii) at least one image of the subsequent stereo pair of images, and (iv) an additional depth map or at least one image of an additional stereo pair of images to generate the subsequent depth map.

* * * * *